(12) United States Patent
Minami

(10) Patent No.: US 8,033,957 B2
(45) Date of Patent: Oct. 11, 2011

(54) CLUTCH CONTROLLER, STRADDLE-TYPE VEHICLE, AND METHOD FOR CONTROLLING CLUTCH

(75) Inventor: Kengo Minami, Shizuoka (JP)

(73) Assignee: Yamaha Hatsudoki Kabushiki Kaisha, Iwata-Shi (JP)

( * ) Notice: Subject to any disclaimer, the term of this patent is extended or adjusted under 35 U.S.C. 154(b) by 902 days.

(21) Appl. No.: 12/035,760

(22) Filed: Feb. 22, 2008

(65) Prior Publication Data

US 2008/0207393 A1   Aug. 28, 2008

(30) Foreign Application Priority Data

Feb. 23, 2007  (JP) ................................ 2007-043645
Sep. 6, 2007   (JP) ................................ 2007-231133

(51) Int. Cl.
*B60W 10/02* (2006.01)
*B60W 10/06* (2006.01)

(52) U.S. Cl. ...................................................... 477/180
(58) Field of Classification Search .................. 477/176, 477/180
See application file for complete search history.

(56) References Cited

U.S. PATENT DOCUMENTS

| 4,860,863 | A | * | 8/1989 | Hayashi | 477/39 |
| 4,969,545 | A | * | 11/1990 | Hayashi | 477/176 |
| 5,853,350 | A | * | 12/1998 | Hasegawa et al. | 477/166 |
| 6,502,681 | B1 | * | 1/2003 | Ota et al. | 192/84.6 |
| 2007/0275823 | A1 | * | 11/2007 | Motosugi et al. | 477/176 |
| 2009/0055060 | A1 | * | 2/2009 | Minami | 701/54 |

FOREIGN PATENT DOCUMENTS

| DE | 10 2005 030 191 A1 | 2/2006 |
| DE | 10 2005 057 844 A1 | 6/2006 |
| DE | 10 2005 030 534 A1 | 1/2007 |
| EP | 1 617 058 A2 | 1/2006 |
| EP | 1 688 635 A1 | 8/2006 |
| JP | 2001-146930 | 5/2001 |
| WO | WO 03/019029 A1 | 3/2003 |

* cited by examiner

*Primary Examiner* — Sherry Estremsky
(74) *Attorney, Agent, or Firm* — Rabin & Berdo, PC

(57) ABSTRACT

Appropriate torque is transmitted via a clutch that does not spend too much time on its engaging operation. A clutch controller controls a degree of engagement of the clutch by actuating a clutch actuator based on a difference between actual transmission torque that is transmitted from a drive-side member of a clutch to a driven-side member of the clutch, and target transmission torque that is supposed to be transmitted from the drive-side member to the driven-side member. The clutch controller also determines whether or not a difference in rotational speed between the drive-side member and the driven-side member of the clutch is reduced at an appropriate rate, and depending on the determination result, corrects the target transmission torque.

9 Claims, 12 Drawing Sheets (a)

(b)

(c)

(d)

CLUTCH CONTROLLER, STRADDLE-TYPE VEHICLE, AND METHOD FOR CONTROLLING CLUTCH

RELATED APPLICATIONS

This application claims the benefit of priority under 35 USC 119 of Japanese patent application no. 2007-043645, filed on Feb. 23, 2007, and Japanese patent application no. 2007-231133, filed on Sep. 6, 2007, which applications are hereby incorporated by reference in their entireties.

BACKGROUND OF THE INVENTION

1. Field of the Invention

The present invention relates to a technology for controlling the degree of engagement of a clutch with an actuator.

2. Description of Related Art

Conventional semi-automatic vehicles that actuate an actuator to engage or disengage a clutch control relative positions of drive-side and driven-side members of the clutch (the degree of engagement of the clutch) based on a difference in rotational speed between these members during engaging operation of the clutch (see, for example, JP-A-2001-146930).

The degree of engagement is controlled based on the difference in rotational speed between the drive-side and driven-side members. However, this can prevent appropriate torque from being constantly transmitted via the clutch, and thus can impair riding comfort during engaging operation of the clutch. For example, torque transmitted from the drive-side member to the driven-side member may sharply increase. Maintenance of a half-clutch state until the difference in rotational speed is almost zero has also been proposed. However, such control results in excessively low torque being continuously transmitted via the clutch for a long time period. Thus, the rider may perceive excessive deceleration of the vehicle.

SUMMARY OF THE INVENTION

The present invention addresses these problems and provides a clutch controller for a straddle-type vehicle that transmits an appropriate amount of torque via the clutch and prevents the clutch from spending too much time on its engaging operation.

Accordingly, the present invention provides a clutch controller including an actuator for changing the degree of engagement between drive-side and driven-side members of a clutch. An actual torque obtaining section obtains torque transmitted from the drive-side member to a downstream mechanism of a torque transmission path as actual transmission torque, the downstream mechanism including the driven-side member. A target torque obtaining section obtains torque that is supposed to be transmitted from the drive-side member to the downstream mechanism as target transmission torque. A control unit controls the degree of engagement of the clutch by actuating the actuator based on a difference between the actual transmission torque and the target transmission torque. The target torque obtaining section includes a determining section for determining whether or not a difference in rotational speed between the drive-side member and the driven-side member is reduced at an appropriate rate, and depending on the determination result, corrects the target transmission torque.

The present invention is also directed to a straddle-type vehicle including the clutch controller.

The present invention is further directed to a method for controlling a clutch, including the steps of: obtaining torque transmitted from a drive-side member of the clutch to a downstream mechanism in a torque transmission path as actual transmission torque, the downstream mechanism including a driven-side member of the clutch; obtaining torque that is supposed to be transmitted from the drive-side member to the downstream mechanism as target transmission torque; controlling the degree of engagement of the clutch by actuating an actuator based on a difference between the actual transmission torque and the target transmission torque; determining whether or not a difference in rotational speed between the drive-side member and the driven-side member is reduced at an appropriate rate; and correcting the target transmission torque depending on the determination result from the determining step.

The present invention transmits an appropriate amount of torque via the clutch. The present invention also prevents the clutch from spending too much time on its engaging operation. More specifically, the rate-of-change of engine speed depends on a difference between torque outputted from an engine (engine torque) and the actual transmission torque transmitted via the clutch. Therefore, setting the target transmission torque at a value close to the engine torque can cause the difference between the actual transmission torque and the engine torque to be small. If this happens, the rate-of-change of engine speed decreases, and therefore, the difference in rotational speed between the drive-side member and the driven-side member is reduced at a lower rate. Thus, the clutch spends too much time on its engaging operation. According to the present invention, it is determined whether or not the difference in rotational speed between the drive-side member and the driven-side member is reduced at an appropriate rate, and depending on the determination result, the target transmission torque is corrected. This prevents the clutch from spending too much time on its engaging operation. The straddle-type vehicle of the invention may be a motorcycle (including a scooter), a four-wheeled buggy or a snowmobile, for example.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

FIG. 4(a) shows an example of changes in degree of engagement of a clutch at the time of gear shifting. FIG. 4(b) shows an example of changes in actual transmission torque. FIG. 4(c) shows an example of changes in target transmission torque. FIG. 4(d) shows an example of changes in engine speed.

DETAILED DESCRIPTION OF THE INVENTION

Figure 1:
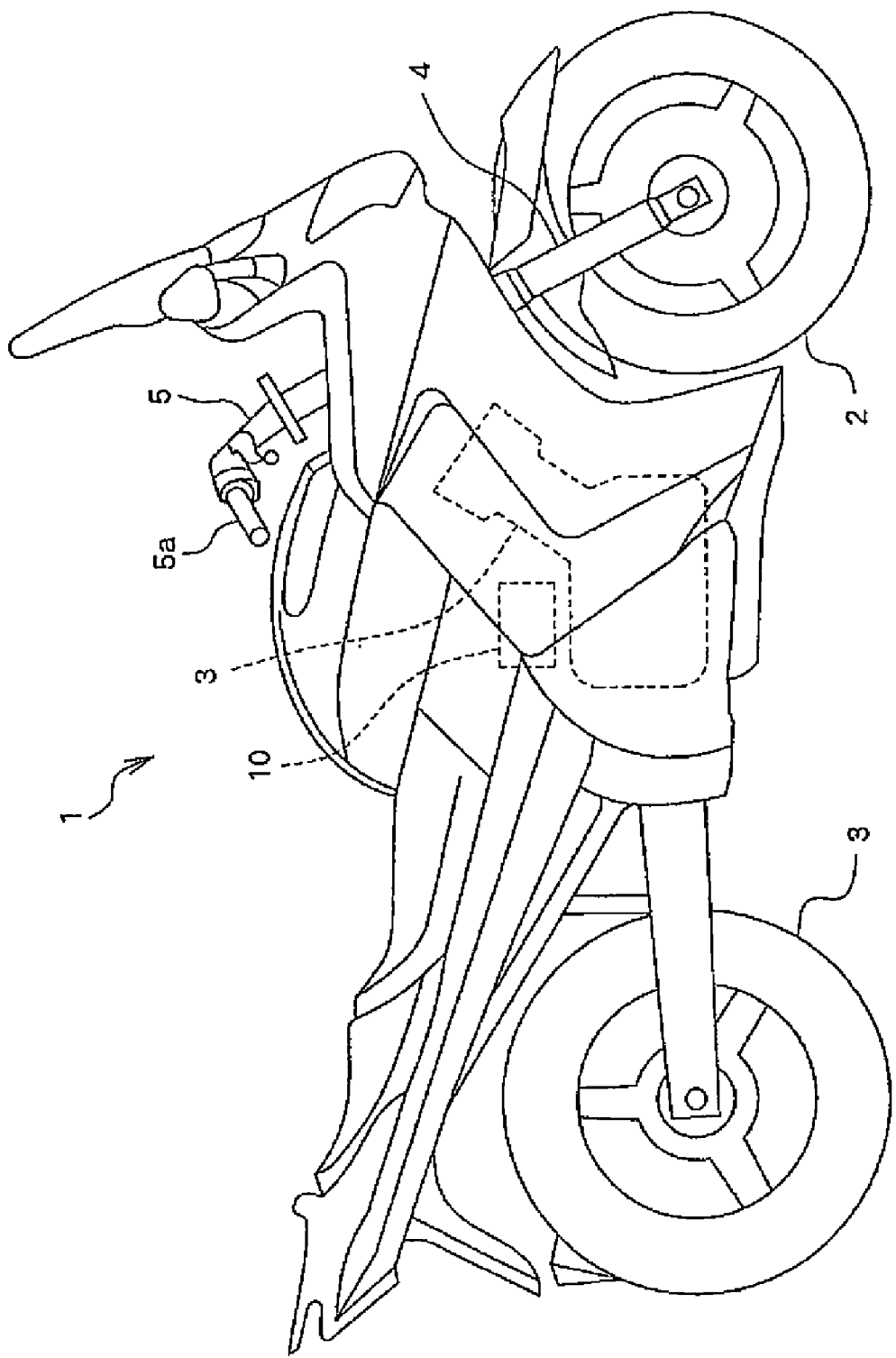
FIG. 1 is a side view of a motorcycle provided with a clutch controller according to an embodiment of the present invention.
Figure 2:
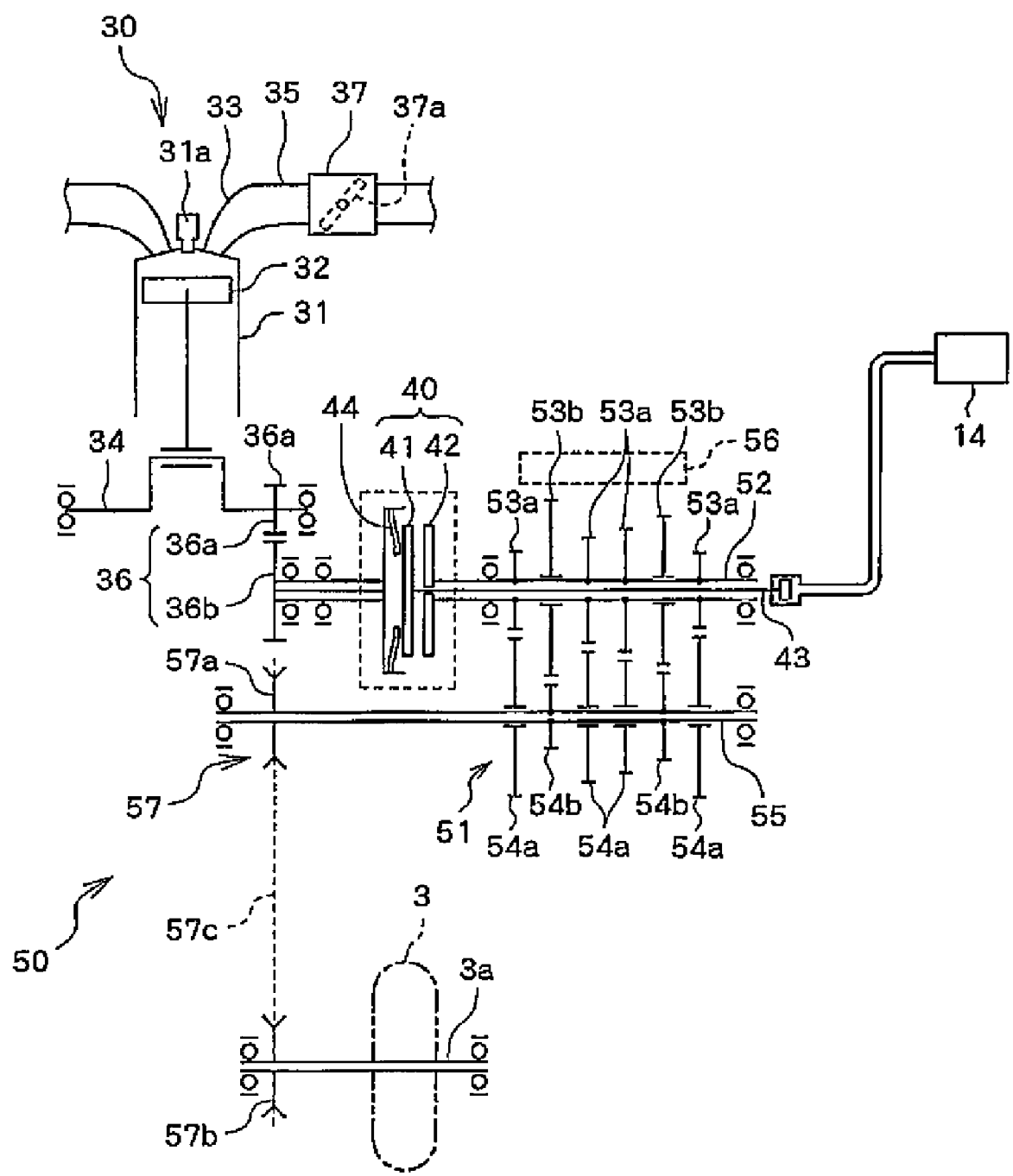
FIG. 2 is a schematic view of a mechanism provided on a torque transmission path of the motorcycle.

An embodiment of the present invention is described below with reference to the drawings. FIG. 1 is a side view of a motorcycle 1 provided with a clutch controller 10 according to the invention. FIG. 2 is a schematic view of a mechanism located on a torque transmission path of motorcycle 1.

As shown in FIGS. 1 and 2, in addition to clutch controller 10, motorcycle 1 comprises an engine 30, a primary speed reducing mechanism 36, a clutch 40, a secondary speed reducing mechanism 50, a front wheel 2 and a rear wheel 3.

Front wheel 2 is supported by lower ends of a front fork 4, and handlebars 5 are connected to the top of front fork 4. An acceleration grip 5a mounted to a right end of handlebars 5 is connected to a throttle valve 37a provided in a throttle body 37 (FIG. 2). Throttle valve 37a is opened according to a rider's accelerator operation, and a certain amount of air that depends on the opening of throttle valve 37a is delivered to engine 30. Motorcycle 1 may be provided with an electronically-controlled throttle device. In this case, a sensor for detecting the rider's accelerator operation and an actuator for opening throttle valve 37a according to the detected accelerator operation are provided.

As shown in FIG. 2, engine 30 has a cylinder 31, a piston 32, an intake port 33 and a crankshaft 34. Throttle body 37 is connected to intake port 33 via an intake pipe 35.

Throttle valve 37a is placed within an intake passage of throttle body 37. A mixture of air that flows through the intake passage of throttle body 37 and fuel supplied from a fuel supplier (for example, an injector or carburetor) is delivered to an interior of cylinder 31. A spark plug 31a faces the interior of cylinder 31 in order to ignite the air-fuel mixture within cylinder 31. Burning the air-fuel mixture causes piston 32 to reciprocate within cylinder 31. Reciprocating motion of piston 32 is converted into rotating motion by crankshaft 34, thereby outputting torque from engine 30.

Primary speed reducing mechanism 36 includes a drive-side primary reduction gear 36a that operates in conjunction with crankshaft 34; and a driven-side primary reduction gear 36b that meshes with primary reduction gear 36a. Primary speed reducing mechanism 36 decelerates rotation of crankshaft 34 at a predetermined gear ratio.

Clutch 40 transmits torque outputted from engine 30 to the downstream side of clutch 40 or interrupts transmission of torque. Clutch 40 is a friction clutch, for example, and is provided with a drive-side member 41 and a driven-side member 42. Drive-side member 41 includes a friction disk, for example, and rotates together with primary reduction gear 36b. Driven-side member 42 includes a clutch disk, for example, and rotates together with a main shaft 52. Drive-side member 41 and driven-side member 42 are pressed against each other by elastic force of a clutch spring 44 at the time of engaging clutch 40, so that torque of engine 30 is transmitted from drive-side member 41 to driven-side member 42. In turn, at the time of disengaging clutch 40, driven-side member 42 and drive-side member 41 are moved away from each other, so that torque transmission from drive-side member 41 is interrupted. Clutch controller 10 is provided with a clutch actuator 14 that performs an engaging operation of clutch 40 (switching from a disengaged to an engaged state) and a disengaging operation thereof (switching from an engaged to a disengaged state).

Secondary speed reducing mechanism 50 decelerates rotation of main shaft 52 and transmits the decelerated rotation to an axle 3a of rear wheel 3. Secondary speed reducing mechanism 50 is provided with a gearbox 51 and a transmission mechanism 57. Gearbox 51 is a mechanism to change reduction ratios, such as a constant-mesh gearbox and a selective-sliding gearbox.

Gearbox 51 has plural shift gears 53a (for example, first-speed, second-speed, third/fourth-speed gears) and shift gears 53b (for example, fifth-speed and six-speed gears) on main shaft 52. Gearbox 51 also has plural shift gears 54a (for example, first-speed, second-speed, third/fourth-speed gears) and shift gears 54b (for example, fifth-speed and six-speed gears) on countershaft 55. Shift gears 53a are spline-connected to and operate in conjunction with main shaft 52. Shift gears 54a run idle to countershaft 55 and mesh with shift gears 53a. Shift gears 53b run idle to main shaft 52. Shift gears 54b mesh with shift gears 53b and are spline-connected to and operate in conjunction with countershaft 55.

Gearbox 51 also comprises a gearshift mechanism 56. Gearshift mechanism 56 includes a shift fork and a shift drum, for example, and selectively moves shift gears 53a, 53b, 54a, 54b in the axial direction of main shaft 52 or countershaft 55. Then, gearshift mechanism 56 causes shift gears 53b, 54a, which are provided to turn free to the corresponding shafts, to connect with adjacent shift gears 53a, 54b, which operate in conjunction with the corresponding shafts. This changes the pairs of shift gears to transmit torque from main shaft 52 to countershaft 55. Gearshift mechanism 56 is actuated by power inputted from a shift actuator 16.

Transmission mechanism 57 decelerates rotation of countershaft 55 and transmits the decelerated rotation to axle 3a of rear wheel 3. Transmission mechanism 57 includes a drive-side member 57a (for example, a drive-side sprocket) that operates in conjunction with countershaft 55; a driven-side member 57b (for example, a driven-side sprocket) that operates in conjunction with axle 3a; and a transmission member 57c (for example, a chain) that transmits torque from drive-side member 57a to driven-side member 57b.

Torque outputted from engine 30 is transmitted to drive-side member 41 of clutch 40 via primary speed reducing mechanism 36. Torque transmitted to drive-side member 41 is transmitted to axle 3a of rear wheel 3 via driven-side member 42, gearbox 51, and transmission mechanism 57, when clutch 40 is engaged or when drive-side member 41 and driven-side member 42 contact each other, that is, when clutch 40 is in a half-clutch state.

Figure 3:
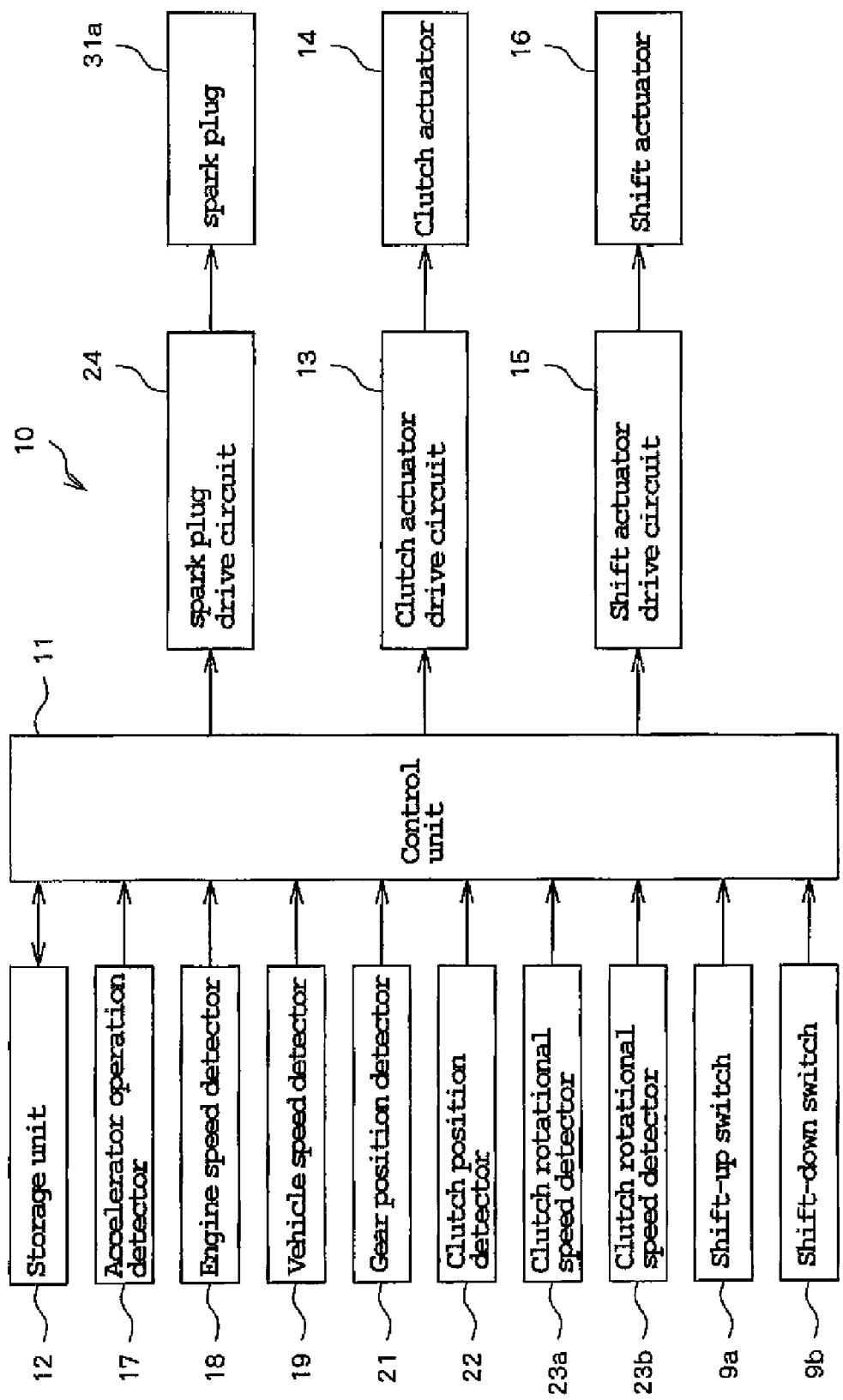
FIG. 3 is a block diagram of the clutch controller.

A configuration of clutch controller 10 is now described. Motorcycle 1 is a semi-automatic vehicle that changes the shift gears of gearbox 51 without the need for the rider to operate the clutch. Clutch controller 10 controls the degree of engagement of clutch 40 (relative positions of drive-side member 41 and driven-side member 42) during engaging operation thereof, and changes shift gears 53a, 53b, 54a, 54b. FIG. 3 is a block diagram of clutch controller 10. As shown in FIG. 3, clutch controller 10 comprises a control unit 11, a storage unit 12, a clutch actuator drive circuit 13, a clutch actuator 14, a shift actuator drive circuit 15, a shift actuator 16, a spark plug drive circuit 24, an accelerator operation detector 17, an engine speed detector 18, a vehicle speed detector 19, a gear position detector 21, a clutch position detector 22 and clutch rotational speed detectors 23a, 23b. Control unit 11 is connected to a shift-up switch 9a and a shift-down switch 9b.

Control unit 11 includes a central processing unit (CPU). In accordance with programs stored in storage unit 12, control unit 11 changes shift gears 53a, 53b, 54a, 54b of gearbox 51 according to the rider's gearshift operation (in this example, switching shift-up switch 9a or shift-down switch 9b ON), while controlling the degree of engagement of clutch 40. The processing executed by control unit 11 is discussed in detail later.

Storage unit 12 includes a nonvolatile memory and a volatile memory. Storage unit 12 stores in advance programs executed by control unit 11 and tables or expressions used for processing in control unit 11. These tables and expressions are discussed in detail later.

Clutch actuator drive circuit 13 supplies drive voltage or drive current clutch to actuator 14 in accordance with a control signal inputted from control unit 11. Clutch actuator 14 includes, for example, a motor and a power transmission mechanism (such as hydraulic path and wire), and is driven by receiving electric power supplied by clutch actuator drive circuit 13. In this example, clutch actuator 14 presses a push rod 43 or releases the pressed push rod 43. When push rod 43 is pressed by clutch actuator 14, it moves drive-side member 41 and driven-side member 42 away from each other against the elastic force of clutch spring 44, so that clutch 40 is disengaged. In contrast, when the pressed push rod 43 is released by clutch actuator 14, it returns to its original position (the position at the time when clutch 40 is engaged) using the elastic force of clutch spring 44. Thus, drive-side member 41 and driven-side member 42 approach each other, so that clutch 40 is engaged. In addition, clutch actuator 14 puts clutch 40 to be in a half-clutch state during engaging operation of clutch 40. When clutch 40 is in a half-clutch state, only part of the torque of engine 30 is transmitted from drive-side member 41 to driven-side member 42.

Shift actuator drive circuit 15 supplies drive voltage or drive current to shift actuator 16 in accordance with a control signal inputted from control unit 11. Shift actuator 16 includes, for example, a motor and a power transmission mechanism (such as hydraulic path and wire), and is driven by receiving electric power supplied from shift actuator drive circuit 15. Shift actuator 16 actuates gearshift mechanism 56 to change shift gears 53a, 53b, 54a, 54b to transmit torque from main shaft 52 to countershaft 55, in order to change the reduction ratios.

Spark plug drive circuit 24 switches electric current supplied to drive spark plug 31a ON or OFF, according to a control signal inputted from control unit 11. Spark plug 31a ignites when the electric current is switched ON or OFF.

Accelerator operation detector 17 detects an amount of accelerator operation by the rider (hereinafter referred to as accelerator displacement). Examples of accelerator operation detector 17 are a throttle position sensor for detecting a throttle opening and an accelerator position sensor mounted to accelerator grip 5a to detect a rotation angle of accelerator grip 5a. Based on the signal outputted from accelerator operation detector 17, control unit 11 detects accelerator displacement by the rider.

Engine speed detector 18 detects a rotational speed of engine 30 hereinafter referred to as engine speed). Examples of engine speed detector 18 are a crank angle sensor for outputting a pulse signal with a frequency according to the rotational speed of crankshaft 43 or primary reduction gears 36a, 36b and a tachogenerator for outputting a voltage signal according to the rotational speed thereof. Control unit 11 calculates engine speed based on the signal inputted from engine speed detector 18.

Vehicle speed detector 19 detects a vehicle speed and outputs a signal to control unit 11 according to, for example, the rotational speed of axle 3a of rear wheel 3 or that of countershaft 55. Control unit 11 calculates the vehicle speed based on the signal inputted from vehicle speed detector 19. Vehicle speed detector 19 may output a signal to control unit 11 according to the rotational speed of main shaft 52. In this case, control unit 11 calculates the vehicle speed not only based on the input signal, but also based on the reduction ratio of gearbox 51 and that of transmission mechanism 57.

Gear position detector 21 detects positions of shift gears 53a, 53b, 54a, 54b provided movably in the axial direction of countershaft 55 or main shaft 52. An example of gear position detector 21 is a potentiometer mounted to gearshift mechanism 56 or shift actuator 16. Gear position detector 21 outputs a signal to control unit 11 according to positions of shift gears 53a, 53b, 54a, 54b. Based on the input signal, control unit 11 detects that movements of shift gears 53a, 53b, 54a, 54b, which are associated with the gear shifting, have been completed.

Clutch position detector 22 detects the degree of engagement of clutch 40. Examples of clutch position detector 22 are a potentiometer for outputting a signal according to the position of push rod 43 and a potentiometer for outputting a signal according to the position or rotation angle of the output shaft of clutch actuator 14. Based on the signal inputted from clutch position detector 22, control unit 11 detects the degree of engagement of clutch 40.

Clutch rotational speed detector 23a detects the rotational speed of drive-side member 41. Examples of clutch rotational speed detector 23a are a rotary encoder for outputting a pulse signal with a frequency according to the rotational speed of drive-side member 41 and a tachogenerator for outputting a voltage signal according to the rotational speed of drive-side member 41. In turn, clutch rotational speed detector 23b detects the rotational speed of driven-side member 42. Examples of clutch rotational speed detector 23b are a rotary encoder and a tachogenerator, as described for clutch rotational speed detector 23a.

Shift-up switch 9a and shift-down switch 9b allow the rider to provide instructions to change shift gears 53a, 53b, 54a, 54b to clutch controller 11. Switches 9a, 9b output a signal to control unit 11 according to the gear shift instructions. Control unit 11 actuates shift actuator 16 according to the input signal to change shift gears 53a, 53b, 54a, 54b to transmit torque from main shaft 52 to countershaft 55. Shift-up switch 9a and shift-down switch 9b are provided adjacent to accelerator grip 5a, for example.

The processing executed by control unit 11 is now described. During engaging operation of clutch 40, control unit 11 obtains torque Tac (hereinafter referred to as actual transmission torque) transmitted from drive-side member 41 to a downstream mechanism (such as driven-side member 42 or countershaft 55 and axle 3a located downstream of driven-side member 42) in the torque transmission path including driven-side member 42. In addition, control unit 11 obtains torque Ttg (hereinafter referred to as target transmission torque) that is supposed to be transmitted from drive-side member 41 to the downstream mechanism. Control unit 11 then actuates actuator 14 based on the difference between actual transmission torque Tac and target transmission torque Ttg to control the degree of engagement of clutch 40.

FIGS. 4(a)-4(d) are time charts for describing an overview of control by control unit 11. FIG. 4(a) shows an example of changes in degree of engagement of clutch 40 at the time of gear shifting. FIG. 4(b) shows an example of changes in actual transmission torque Tac. FIG. 4(c) shows an example of changes in target transmission torque Ttg. FIG. 4(d) shows an example of changes in engine speed. A broken line in FIG. 4(b) shows changes in torque TEac outputted from engine 30 (torque transmitted from engine 30 via primary speed reducing mechanism 36 to drive-side member 41, hereinafter referred to as EG torque). The shift-up operation is now described as an example.

At time t1, when the rider turns shift-up switch 9a ON, control unit 11 allows clutch 40 to be disengaged, as shown in FIG. 4(a). Consequently, as shown in FIG. 4(b), actual transmission torque Tac is 0. At time t2, control unit 11 starts engaging operation of clutch 40 after some of shift gears 53a, 53b, 54a, 54b have already been moved.

Specifically, as shown in FIG. 4(c), control unit 11 sets target transmission torque Ttg, while actuating clutch actuator 14 such that actual transmission torque Tac approximates target transmission torque Ttg. Thereby, as shown in FIG. 4(a), clutch 40 is switched from the disengaged state to the half-clutch state. While clutch 40 is in the half-clutch state, the degree of engagement of clutch 40 is enhanced gradually. Consequently, as shown in FIGS. 4(b) and 4(c), actual transmission torque Tac reaches target transmission torque Ttg at time t3. After that, control unit 11 also actuates clutch actuator 14 such that actual transmission torque Tac follows target transmission torque Ttg. Then, as shown in FIG. 4(a), control unit 11 allows clutch 40 to be completely engaged at the point in time (t4) when the difference in rotational speed between drive-side member 41 and driven-side member 42 (hereinafter referred to as clutch rotational speed difference) is smaller than a predetermined value (for example, zero or close to zero, hereinafter referred to as rotational speed difference for discontinuing half-clutch).

In addition, at the time of shift-up operation, control unit 11 controls the engine to reduce EG torque TEac (for example, retarding control). Thus, as shown by the broken line in FIG. 4(b), EG torque TEac is lower at time t1 than the past values of actual transmission torque Tac. Then, at time t2, when the engaging operation of clutch 40 starts, actual transmission torque Tac increases and is higher than EG torque TEac. When actual transmission torque Tac is higher than EG torque TEac, not only EG torque TEac, but also torque produced due to the inertia of engine 30 and primary speed reducing mechanism 36 (hereinafter referred to as inertia torque TIac) are transmitted as actual transmission torque Tac. Thus, in this case, as shown by the solid line in FIG. 4(d), engine speed decreases gradually from time t2 to t4 at a rate according to the difference between EG Torque TEac and actual transmission torque Tac. Generally, the engine output characteristics show that EG torque TEac increases as engine speed decreases. Thus, as shown in FIG. 4(b), EG torque TEac increases from time t2 to t4 as engine speed decreases. Engine speed increases or decreases in such a manner during engaging operation of clutch 40. This eliminates the clutch rotational speed difference at time t4, and therefore, the half-clutch state is discontinued under the aforementioned control by control unit 11. At time t4 when drive-side member 41 is completely engaged with driven-side member 42, control unit 11 stops the aforementioned engine control designed to reduce EG torque TEac. Therefore, EG torque TEac increases at time t4.

Under such control that actual transmission torque Tac approximates target transmission torque Ttg, the clutch rotational speed difference is reduced at an excessively low rate, which increases the time spent for engaging operation of clutch 40. Specifically, if the difference is small between EG torque TEac and actual transmission torque Tac, the clutch rotational speed difference is reduced at a low rate. The reasons for this event are described below.

As described above, engine speed increases or decreases at a rate according to the difference between EG torque TEac and actual transmission torque Tac. In other words, as shown in FIGS. 4(a)-4(d), if EG Torque TEac is lower than actual transmission torque Tac, inertia torque TIac of engine 30 is transmitted as part of actual transmission torque Tac via clutch 40. Thus, engine speed decreases at a rate according to the difference between EG torque TEac and actual transmission torque Tac or according to inertia torque TIac. In contrast, if EG torque TEac is higher than actual transmission torque Tac, the difference therebetween contributes to an increase in engine speed, and the increasing rate depends on the difference between EG torque TEac and actual transmission torque Tac. Under the aforementioned control such that actual transmission torque Tac approximates target transmission torque Ttg, setting target transmission torque Ttg at a value close to EG torque TEac results in a smaller difference between EG torque TEac and actual transmission torque Tac during engaging operation of the clutch. In this case, engine speed increases or decreases at an excessively low rate, and accordingly, the clutch rotational speed difference is reduced at a lower rate. Thus, clutch 40 takes too much time for its engaging operation.

In order to avoid such a situation, control unit 11 determines whether or not the clutch rotational speed difference is reduced at an appropriate rate, and according to the determination result, corrects target transmission torque Ttg. Specifically, as shown by phantom line L1 in FIG. 4(c), control unit 11 corrects target transmission torque Ttg to increase the difference between target transmission torque Ttg and EG torque TEac. This results in a larger difference between actual transmission torque Tac and EG torque TEac during engaging operation of the clutch, as shown in phantom line L2 in FIG. 4(b). Thereby, as shown by phantom line L3 in FIG. 4(d), engine speed decreases at a higher rate, and therefore, it takes a shorter time until the clutch rotational speed difference is below the rotational speed difference for discontinuing half-clutch. Up to this point, the discussion has focused on the overview of control by control unit 11. The processing executed by control unit 11 is now discussed below in detail.

Figure 5:
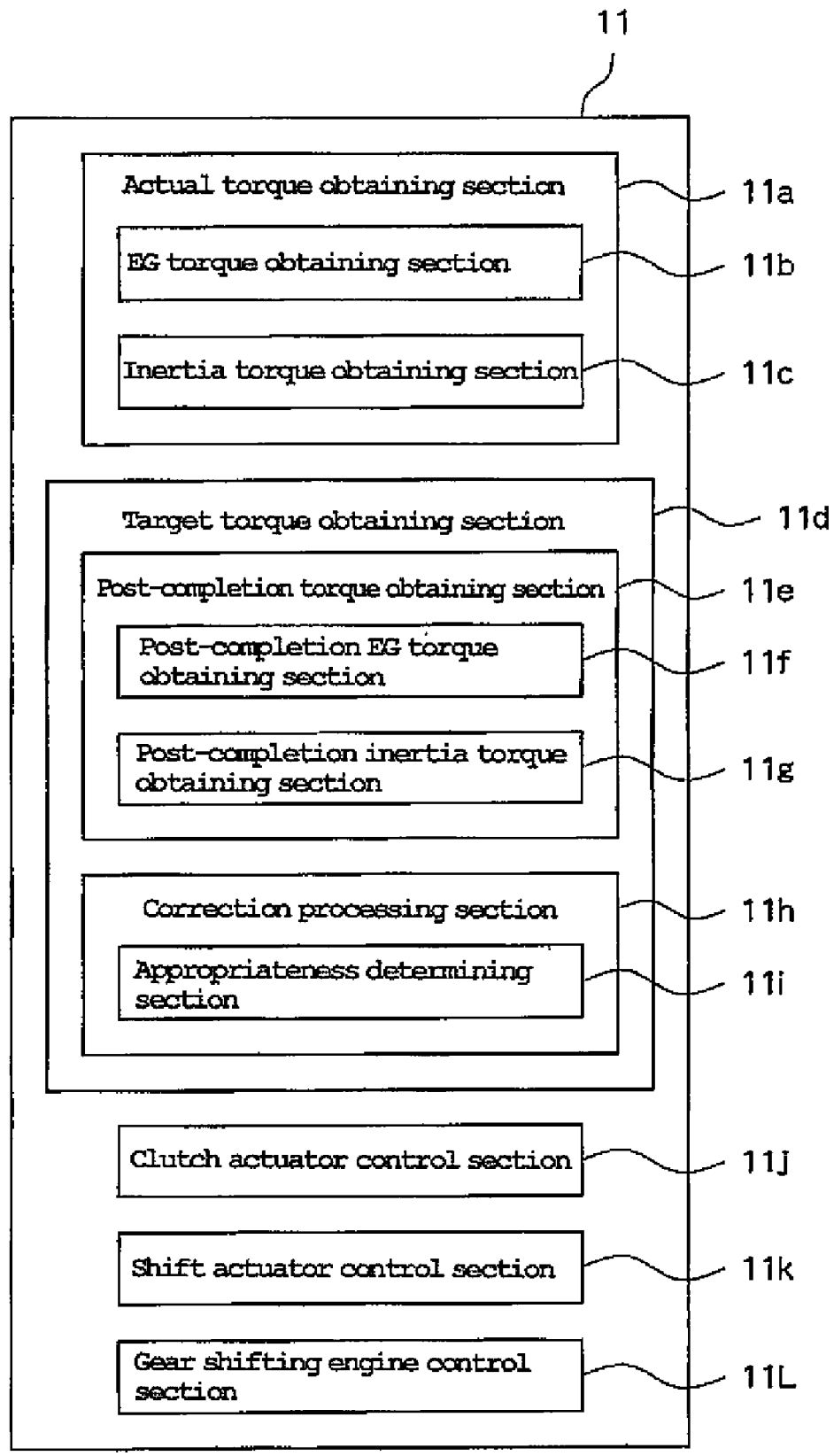
FIG. 5 is a block diagram of the control unit provided in the clutch controller.

FIG. 5 is a block diagram of control unit 11. As shown in FIG. 5, control unit 11 includes an actual torque obtaining section 11a; a target torque obtaining section 11d; a clutch actuator control section 11j; a shift actuator control section 11k; and gear shifting engine control section 11L. Actual torque obtaining section 11a includes an EG torque obtaining section 11b and an inertia torque obtaining section 11c. In turn, target torque obtaining section 11d includes a post-completion torque obtaining section 11e and a correction processing section 11h.

Actual torque obtaining section 11*a* is first described. Actual torque obtaining section 11*a* calculates actual transmission torque Tac based on EG torque TEac and torque TIac (hereinafter referred to as inertia torque) produced due to the inertia of the mechanism (such as crankshaft 34, piston 32 and primary speed reducing mechanism 36) upstream of drive-side member 41 in the torque transmission path. Actual torque obtaining section 11*a* executes this processing in a predetermined sampling cycle (for example, several milliseconds) during engaging operation of clutch 40. Actual transmission torque Tac is described herein as torque transmitted to driven-side member 42 in the mechanism downstream of drive-side member 41.

The processing for obtaining EG torque Teac is first described. Storage unit 12 stores in advance a table (hereinafter referred to as the EG torque table) that establishes the correspondence between EG torque TEac, and engine speed and accelerator displacement. EG torque obtaining section 11*b* then detects accelerator displacement based on the signal inputted from accelerator operation detector 17, while detecting engine speed based on the signal inputted from engine speed detector 18. EG torque obtaining section 11*b* then refers to the EG torque table to obtain the EG torque TEac that corresponds to the detected accelerator displacement and engine speed.

In place of the EG torque table, storage unit 12 may store in advance an expression (hereinafter referred to as the EG torque relational expression) that represents the relationship between engine speed, accelerator displacement and EG torque TEac. In this case, EG torque obtaining section 11*b* substitutes the detected engine speed and accelerator displacement into the EG torque relational expression in order to calculate EQ torque TEac.

Alternatively, EG torque obtaining section 11*b* may obtain EG torque TEac based on the pressure of air flowing through the interior of intake pipe 35 (hereinafter referred to as intake pressure). For example, storage unit 12 may store in advance a table that establishes the correspondence between EG torque TEac, and the intake pressure and engine speed. In addition, a pressure sensor for outputting a signal according to the intake pressure is disposed in intake pipe 35. In this case, EG torque obtaining section 11*b* detects the engine speed at the time when the crank angle is a predetermined value (for example, at the end of intake stroke), while detecting the intake pressure based on the signal inputted from the pressure sensor. Then, EG torque obtaining section 11*b* refers to the table stored in storage unit 12 to obtain EG torque TEac that corresponds to the detected intake pressure and engine speed.

Inertia torque TIac is determined according to variation in engine speed $\Omega e$ per unit time ($d\Omega e/dt$, hereinafter referred to as rate-of-change of EG speed). Storage unit 12 stores in advance an expression that associates inertia torque TIac with the rate-of-change of EG speed ($d\Omega e/dt$). Specifically, storage unit 12 stores an expression, in which inertia torque TIac ($I \times (d\Omega e/dt)$) is obtained by multiplying the inertial moment I on the mechanism upstream of drive-side member 41 by the rate-of-change of EG speed ($d\Omega e/dt$). In this case, inertia torque obtaining section 11*c* calculates the rate-of-change of EG speed ($d\Omega e/dt$) based on the signal inputted from engine speed detector 18. Inertia torque obtaining section 11*c* then multiplies the rate-of-change of EG speed ($d\Omega e/dt$) by inertial moment I, and defines the multiplication result ($I \times (d\Omega e/dt)$) as inertia torque TIac. Storage unit 12 may store a table that establishes the correspondence between the rate-of-change of EG speed ($d\Omega e/dt$) and inertia torque TIac. In this case, inertia torque obtaining section 11*c* refers to the table to obtain the inertia torque TIac that corresponds to the rate-of-change of EG speed ($d\Omega e/dt$).

Actual torque obtaining section 11*a* substitutes EG torque TEac and inertia torque TIac, which are obtained from the aforementioned processing, into the expression stored in storage unit 12 and representing the relationship between EG torque TEac, inertia torque TIac and actual transmission torque Tac, in order to calculate actual transmission torque Tac. For example, actual torque obtaining section 11*a* substitutes EG torque TEac and inertia torque TIac into the following expression (1).

$$Tac = TEac - TIac \quad (1)$$

Torque transmitted to driven-side member 42 in the mechanism located downstream of drive-side member 41 is described herein as actual transmission torque Tac. However, actual torque obtaining section 11*a* may calculate torque transmitted to countershaft 55 or the mechanism downstream of countershaft 55 as actual transmission torque Tac, for example. In this case, actual torque obtaining section 11*a* obtains torque by multiplying the value obtained from expression (1) by the reduction ratio of gearbox 51 after the end of gear shifting (the gear ratio of the shift gears after shift-up or shift-down operation) and by the reduction ratio of transmission mechanism 57, and defines the obtained torque as actual transmission torque Tac.

In addition, when torque produced on the mechanism upstream of primary speed reducing mechanism 36 is stored as EG torque TEac in the aforementioned EG torque table, actual torque obtaining section 11*a* multiplies EG torque TEac obtained from the aforementioned processing by the reduction ratio of primary speed reducing mechanism 36 (the number of teeth of driven-side primary reduction gear 36*b*/the number of teeth of drive-side primary reduction gear 36*a*) in order to calculate actual transmission torque Tac.

The processing for calculating actual transmission torque Tac is not limited to the aforementioned processing. For example, storage unit 12 may store in advance a table or an expression that establishes the correspondence between actual transmission torque Tac and engine speed, accelerator displacement and the rate-of-change of EG speed. In this case, actual torque obtaining section 11*a* uses the table or the expression to directly obtain actual transmission torque Tac from engine speed, the rate-of-change of EG speed and accelerator displacement.

The processing executed by gear shifting engine control section 11L. At the time of gear shifting, if the rotational speed of drive-side member 41 is higher than the rotational speed of driven-side member 42, gear shifting engine control section 11L controls the engine to reduce the torque outputted from engine 30. For example, gear shifting engine control section 11L controls the ignition timing of spark plug 31*a* to retard it relative to normal ignition timing, i.e., during normal driving with clutch 40 completely engaged (hereinafter referred to as retarding control), thereby reducing EG torque TEac. In other words, gear shifting engine control section 11L causes spark plug 31*a* to ignite at a crank angle that reaches at a timing delayed from the crank angle at which spark plug 31*a* ignites during normal driving.

At the time of shift-up operation, some shift gears 53*a*, 53*b*, 54*a*, 54*b*, whose reduction ratios are relatively higher, are changed to other shift gears, whose reduction ratios are relatively lower. Therefore, due to changes between shift gears 53*a*, 53*b*, 54*a*, 54*b*, the rotational speed of driven-side member 42 is lower than the rotational speed of drive-side member 41. Thus, for example, at the time when shift-up switch 9*a* is pressed down, gear shifting engine control section 11L starts retarding control. Alternatively, gear shifting engine control section 11L may actually calculate the difference in rotational speed between drive-side member 41 and driven-side member 42, and if the calculated difference in rotational speed is greater than zero, then may start retarding control.

In the middle of retarding control, EG torque obtaining section 11b calculates torque, which is reduced under retarding control, as EG torque TEac. For example, storage unit 12 stores in advance torque to be reduced when retarding control is performed (hereinafter referred to as reduced torque). EG torque obtaining section 11b subtracts the reduced torque from the torque, which is obtained by referring to the EG torque table in the aforementioned processing, and defines the obtained value as EG torque TEac.

The processing executed by target torque obtaining section 11d is now described. Target torque obtaining section 11d includes post-completion torque obtaining section 11e. Post-completion torque obtaining section 11e calculates torque (torque obtained at time t4 in FIGS. 4(a)-4(d)) that is estimated to be transmitted from drive-side member 41 of clutch 40 to the mechanism downstream of drive-side member 41 (driven-side member 42 in this description) after completion of engagement of clutch 40. Post-completion torque obtaining section 11e then defines the calculated torque as target transmission torque Ttg. Specifically, post-completion torque obtaining section 11e estimates torque TEfin (hereinafter referred to as post-completion EG torque) to be outputted from engine 30 after completion of engagement of clutch 40. In addition, post-completion torque obtaining section 11e estimates inertia torque TIfin (hereinafter referred to as post-completion inertia torque) to be produced on the mechanism upstream of drive-side member 41 in the torque transmission path after completion of clutch engagement. Then, based on the estimated post-completion EG torque TEfin and post-completion inertia torque TIfin, post-completion torque obtaining section 11e calculates torque Tfin (hereinafter referred to as post-completion transmission torque) to be estimated to be transmitted from drive-side member 41 to driven-side member 42 after completion of engagement of clutch 40.

The processing for estimating post-completion EG torque TEfin is first described. As shown in FIG. 5, post-completion torque obtaining section 11e includes post-completion EG torque obtaining section 11f. Before starting or during the engaging operation of clutch 40, post-completion EG torque obtaining section 11f calculates the rotational speed of driven-side member 42 or of the mechanism downstream of driven-side member 42, and based on the calculated rotational speed, estimates the engine speed Ωfin after completion of clutch engagement. Post-completion EG torque obtaining section 11f then estimates post-completion EG torque TEfin based on the estimated engine speed Ωfin and the accelerator displacement.

For example, post-completion EG torque obtaining section 11f detects the current rotational speeds of driven-side member 42 and drive-side member 41, and calculates the clutch rotational speed difference Ωdiff between these detected rotational speeds. In addition, post-completion EG torque obtaining section 11f calculates the current engine speed Ωe. Post-completion EG torque obtaining section 11f then substitutes the calculated clutch rotational speed difference Ωdiff and engine speed Ωe into the expression stored in advance in storage unit 12, and defines the obtained value as engine speed Ωfin after completion of clutch engagement. For example, post-completion EG torque obtaining section 11f substitutes the current clutch rotational speed difference Ωdiff and engine speed Ωe into the following expression (2), and defines the obtained value as engine speed Ωfin after completion of clutch engagement.

$$\Omega fin = \Omega e - (\Omega diff \times Pratio) \quad (2)$$

In addition, post-completion EG torque obtaining section 11f detects accelerator displacement based on the signal inputted from accelerator displacement detector 17. Then, for example, post-completion EG torque obtaining section 11f defines the torque that corresponds to engine speed Ωfin and the accelerator displacement in the EG torque table as post-completion EG torque TEfin. In expression (2), Pratio represents the reduction ratio of primary speed reducing mechanism 36. Post-completion EG torque TEfin thus calculated is considered as torque estimated to be outputted from engine 30 after completion of clutch engagement under no retarding control.

The processing for estimating post-completion inertia torque TIfin is now described. As shown in FIG. 5, post-completion torque obtaining section 11e includes post-completion inertia torque obtaining section 11g. Post-completion inertia torque obtaining section 11g estimates post-completion inertia torque TIfin based on the current rate-of-change of the rotational speed (the variation in rotational speed per unit time, hereinafter referred to as rate-of-change of rotational speed) of the mechanism located downstream of drive-side member 41 in the torque transmission path, such as driven-side member 42, countershaft 55 and axle 3a.

The processing for estimating post-completion inertia torque TIfin based on the rotational speed of driven-side member 42 as the downstream mechanism is now described. Post-completion inertia torque obtaining section 11g calculates the current rate-of-change of rotational speed (dΩcl/dt) of driven-side member 42. Post-completion inertia torque obtaining section 11g then substitutes the calculated rate-of-change of rotational speed (dΩcl/dt) of driven-side member 42 into, for example, the following expression (3) in order to calculate post-completion inertia torque TIfin.

$$TIfin = I \times (d\Omega cl/dt) \times Pratio \quad (3)$$

Storage unit 12 stores in advance an expression that represents the relationship between the current rate-of-change of rotational speed (dΩcl/dt) of driven-side member 42 and post-completion inertia torque TIfin.

Alternatively, post-completion inertia torque obtaining section 11g may estimate post-completion inertia torque TIfin based on the rate-of-change of rotational speed of countershaft 55, axle 3a or the like, rather than based on the rate-of-change of rotational speed of driven-side member 42. In this case, post-completion inertia torque obtaining section 11g multiplies the rate-of-change of rotational speed of the above mechanism by the gear ratio of a mechanism located between the above mechanism and engine 30 (for example, the gear ratio of gearbox 51 and the gear ratio of primary speed reducing mechanism 36 after the end of gear shifting) in order to calculate post-completion inertia torque TIfin.

Post-completion inertia torque obtaining section 11g executes processing for calculating post-completion inertia torque TIfin in a predetermined cycle (for example, several milliseconds) during engaging operation of clutch 40. Post-completion inertia torque obtaining section 11g may not necessarily calculate the rate-of-change of rotational speed (dΩcl/dt) of driven-side member 42 in a predetermined cycle, but alternatively, may calculate it immediately before clutch 40 is disengaged (for example, several hundred milliseconds before clutch 40 starts being disengaged (time t1 in FIGS.

4(*a*)-4(*d*))), and continue to use the calculated value for subsequent processing during engaging operation of clutch 40.

Post-completion torque obtaining section 11e substitutes the thus-calculated post-completion EG torque TEfin and post-completion inertia torque TIfin into an expression stored in advance in storage unit 12 in order to calculate post-completion transmission torque Tfin. For example, post-completion torque obtaining section 11e substitutes post-completion EG torque TEfin and post-completion inertia torque TIfin into the following expression (4) in order to calculate post-completion transmission torque Tfin.

$$Tfin = TEfin - TIfin \qquad (4)$$

Post-completion torque obtaining section 11e tentatively sets target transmission torque Ttg at post-completion transmission torque Tfin thus calculated. In the event that no correction processing is performed by correction processing section 11h, target transmission torque Ttg, set by post-completion torque obtaining section 11e, is provided for processing executed by clutch actuator control section 11j.

The processing executed by correction processing section 11h is now described. As shown in FIG. 5, correction processing section 11h includes an appropriateness determining section 11i that determines whether or not the clutch rotational speed difference is reduced at an appropriate rate for engaging operation of clutch 40. Specifically, appropriateness determining section 11i determines whether or not the clutch rotational speed difference, or an operating condition of engine 30 that correlates with the rate at which the clutch rotational speed difference is reduced, satisfies a predetermined condition (hereinafter referred to as correction condition). The operating condition of engine 30 that correlates with the rate at which the clutch rotational speed difference is reduced, is considered as, for example, the difference between EG torque TEac and actual transmission torque Tac or the rate at which such difference is reduced, and the difference between EG torque TEac and target transmission torque Ttg or the rate at which such difference is reduced. Appropriateness determining section 11i executes processing as described below, for example.

Appropriateness determining section 11i calculates the difference between actual transmission torque Tac and EG torque TEac obtained from the aforementioned processing during engaging operation of clutch 40, and determines whether or not the calculated difference (hereinafter referred to as correction condition torque difference) is smaller than a predetermined value. If the calculated difference is smaller than the correction condition torque difference, appropriateness determining section 11i determines that the correction condition is satisfied. As described above, during engaging operation of clutch 40, the rate at which engine speed increases or decreases is determined according to the difference between EG torque TEac and actual transmission torque Tac. In turn, the rate at which the clutch rotational speed difference is reduced is determined according to the rate at which engine speed increases or decreases and vehicle acceleration. Thus, as the difference is greater between EG torque TEac and actual transmission torque Tac, the clutch rotational speed difference is reduced at an increased rate. Appropriateness determining section 11i thus determines whether or not the clutch rotational speed difference is reduced at an appropriate rate based on the difference between EG torque TEac and actual transmission torque Tac.

Figure 4:
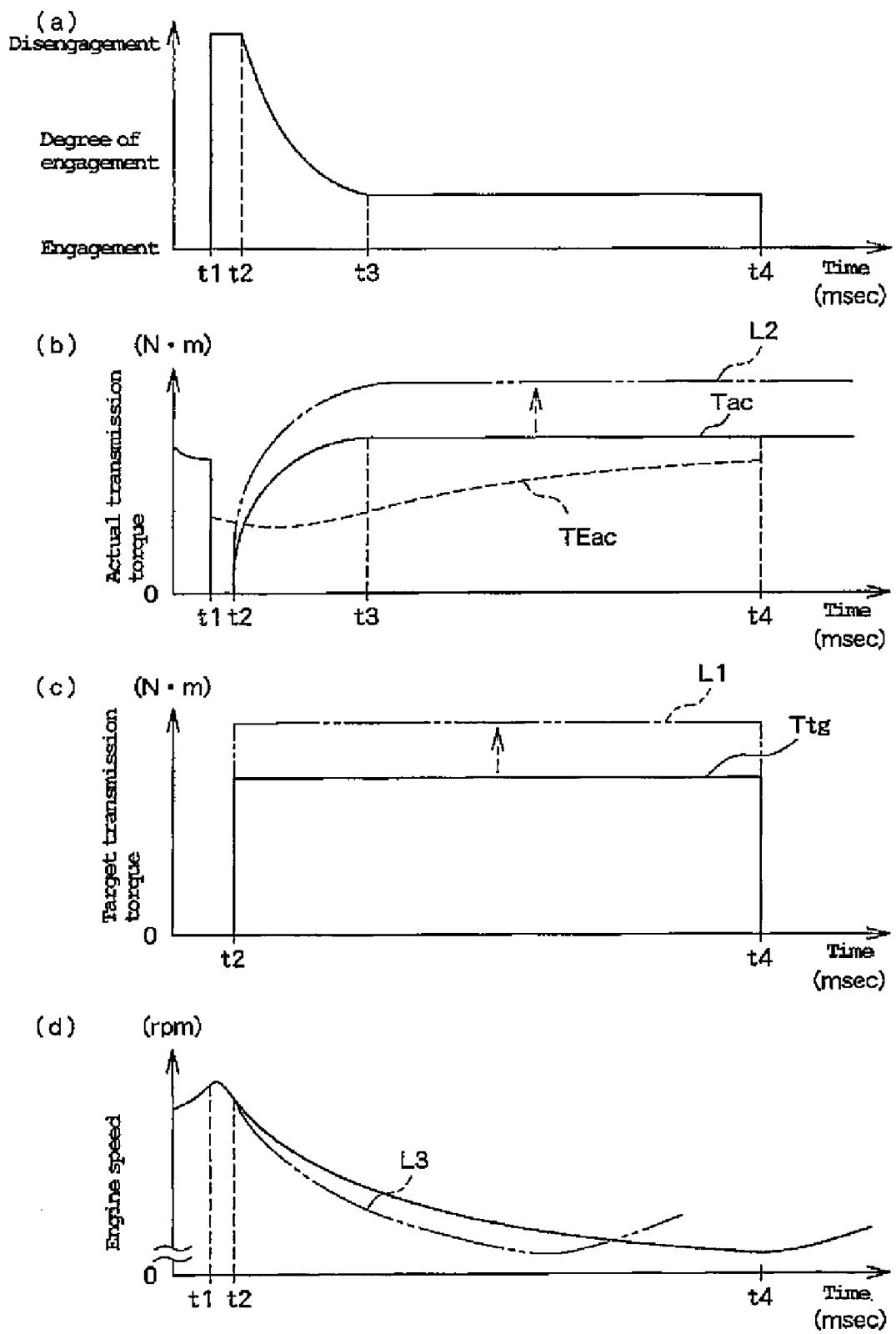
FIGS. 4(a)-4(d) are time charts for describing the overview of control by means of a control unit.

As described above, control unit 11 controls the degree of engagement of clutch 40 such that actual transmission torque Tac approximates target transmission torque Ttg (see FIGS. 4(*a*)-4(*d*)). Thus, when the difference between EG torque TEac and target transmission torque Ttg is smaller than the correction condition torque difference, the difference between actual transmission torque Tac and EG torque TEac is also smaller than the correction condition torque difference during engaging operation of clutch 40. Therefore, the clutch rotational speed difference is reduced at a lower rate. Thus, appropriateness determining section 11i may determine whether or not the clutch rotational speed difference is reduced at an appropriate rate based on the difference between EG torque TEac and target transmission torque Ttg calculated by post-completion torque obtaining section 11e (post-completion transmission torque Tfin), rather than based on the difference between EG torque TEac and actual transmission torque Tac. Specifically, if the difference between EG torque TEac and post-completion transmission torque Tfin is smaller than the correction condition torque difference, appropriateness determining section 11i may determine that the aforementioned correction condition is satisfied.

Alternatively, during engaging operation of clutch 40, appropriateness determining section 11i may calculate the rate at which the difference between EG torque TEac and actual transmission torque Tac is reduced, and based on the calculated reduction rate of the difference, determine whether or not the clutch rotational speed difference is reduced at an appropriate rate. Specifically, during engaging operation of clutch 40, appropriateness determining section 11i may determine whether or not the rate at which the difference between EG torque TEac and actual transmission torque Tac is reduced (hereinafter referred to as correction condition reduction rate) is smaller than a predetermined value. If this reduction rate of the difference is smaller than the correction condition reduction rate, appropriateness determining section 11i may determine that the correction condition is satisfied.

Alternatively, appropriateness determining section 11i may calculate the rate at which the difference between EG torque TEac and target transmission torque Ttg is reduced, and based on the calculated reduction rate of the difference, determine whether or not the clutch rotational speed difference is reduced at an appropriate rate. Specifically, during engaging operation of clutch 40, appropriateness determining section 11i may determine whether or not the rate at which the difference between EG torque TEac and target transmission torque Ttg is reduced is smaller than the correction condition reduction rate. If the thus-calculated reduction rate of the difference is smaller than the correction condition reduction rate, appropriateness determining section 11i may determine that the correction condition is satisfied.

The operating condition of engine 30 that correlates with the rate at which the clutch rotational speed difference is reduced may be accelerator displacement or engine speed. In this case, storage unit 12 stores in advance the engine speed and the accelerator displacement by which the engine speed is estimated to increase or decrease at a lower rate. Appropriateness determining section 11i then detects accelerator displacement and engine speed in a predetermined cycle during engaging operation of clutch 40, and determines whether or not the detected accelerator displacement and engine speed correspond with the accelerator displacement and engine speed stored in storage unit 12. If the detected accelerator displacement and engine speed correspond with the stored accelerator displacement and engine speed, appropriateness determining section 11i may determine that the correction condition is satisfied.

Alternatively, during engaging operation of clutch 40, appropriateness determining section 11i may actually calculate the rate at which the clutch rotational speed difference is reduced, and based on the calculated reduction rate, determine whether or not the clutch rotational speed difference is reduced at an appropriate rate. Specifically, if this calculated reduction rate is lower than a predetermined value, appropriateness determining section 11i may determine that the correction condition is satisfied.

The correction processing executed by correction processing section 11h is now described. If appropriateness determining section 11i determines that the correction condition is satisfied, correction processing section 11h corrects target transmission torque Ttg that has been set at post-completion transmission torque Tfin in processing executed by post-completion torque obtaining section 11e. Specifically, correction processing section 11h corrects or increases the difference between target transmission torque Ttg and EG torque TEac based on EG torque TEac. For example, correction processing section 11h adds or subtracts a predetermined value ΔTmin (for example, the correction condition torque difference) to or from EG torque TEac, and defines the obtained value as corrected target transmission torque Ttg.

If the rotational speed of drive-side member 41 is higher than the rotational speed of driven-side member 42, the clutch rotational speed difference is eliminated by decreasing the rotational speed of drive-side member 41 to the rotational speed of driven-side member 42. Therefore, actual transmission torque Tac needs be higher than EG torque TEac. Thus, in this case, correction processing section 11h sets target transmission torque Ttg at a value obtained by adding the correction condition torque difference ΔTmin to EG torque TEac, in order to increase the difference between EG torque TEac and target transmission torque Ttg.

In contrast, if the rotational speed of drive-side member 41 is lower than the rotational speed of driven-side member 42, the clutch rotational speed difference is eliminated by increasing the rotational speed of drive-side member 41 to the rotational speed of driven-side member 42. Therefore, actual transmission torque Tac needs be lower than EG torque TEac. Thus, in this case, correction processing section 11h sets target transmission torque Ttg at a value obtained by subtracting correction condition torque difference ΔTmin from EG torque TEac, in order increase to the difference between EG torque TEac and target transmission torque Ttg. In processing in such a manner, correction condition torque difference ΔTmin, which is added to EG torque TEac, and correction condition torque difference ΔTmin, which is subtracted from EG torque TEac, may be different values.

The correction processing executed by correction processing section 11h is not limited to the aforementioned processing. For example, correction processing section 11h may multiply target transmission torque Ttg, which is calculated by post-completion torque obtaining section 11e, by a predetermined correction coefficient k (k>1), in order to increase the difference between target transmission torque Ttg and EG torque TEac.

The processing executed by clutch actuator control section 11j is now described. During engaging operation of clutch 40, clutch actuator control section 11j actuates clutch actuator 14 in a predetermined cycle based on the difference between actual transmission torque Tac and target transmission torque Ttg (hereinafter referred to as torque deviation). Specifically, clutch actuator control section 11j actuates clutch actuator 14 by an amount according to the torque deviation to allow actual transmission torque Tac to approximate target transmission torque Ttg. Clutch actuator control section 11j executes the following processing, for example.

Storage unit 12 stores in advance an expression (hereinafter referred to as actuation amount relational expression) that represents the relationship between the torque deviation (Ttg−Tac) and the amount by which clutch actuator 14 is actuated (hereinafter referred to as command actuation amount). Clutch actuator control section 11j calculates the torque deviation (Ttg−Tac) every time actual transmission torque Tac is calculated during engaging operation of clutch 40. Clutch actuator control section 11j then substitutes the torque deviation (Ttg−Tac) into the actuation amount relational expression in order to calculate the command actuation amount, and outputs a control signal to clutch actuator drive circuit 13 according to the calculated command actuation amount. Clutch actuator drive circuit 13 outputs electric power to drive clutch actuator 14 according to the input control signal.

Figure 6:
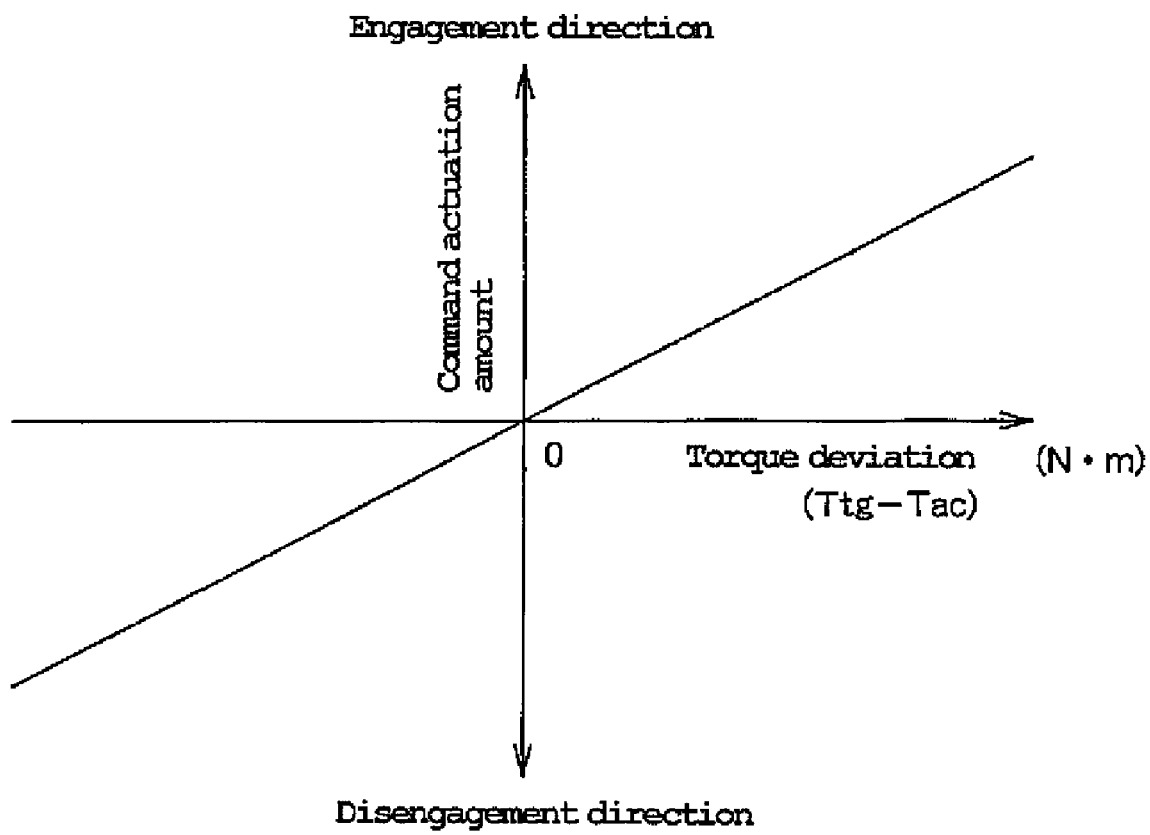
FIG. 6 is a graph showing an example of the relationship between a torque deviation as a difference between target transmission torque and actual transmission torque and a command actuation amount obtained from an actuation amount relational expression.

FIG. 6 is a graph showing the relationship between the torque deviation (Ttg−Tac) and the command actuation amount obtained from the actuation amount relational expression. In FIG. 6, the actuation amount relational expression is established such that if the torque deviation (Ttg−Tac) is positive, clutch actuator 14 is actuated in the direction to engage clutch 40. In turn, the actuation amount relational expression is established such that if the torque deviation (Ttg−Tac) is negative, clutch actuator 14 is actuated in the direction to disengage clutch 40. In addition, the actuation amount relational expression is established such that the command actuation amount increases in proportion to the torque deviation (Ttg−Tac).

Figure 7:
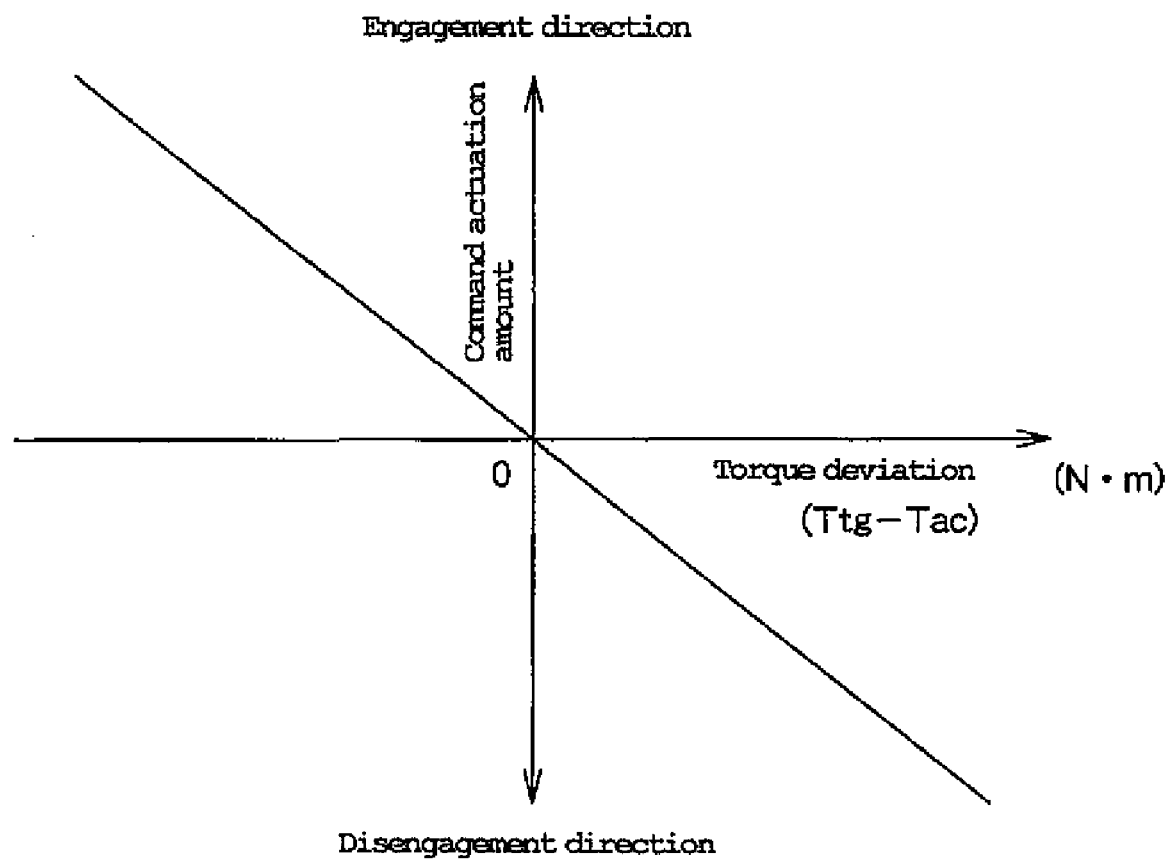
FIG. 7 is a graph showing another example of the relationship between a torque deviation as a difference between target transmission torque and actual transmission torque and a command actuation amount obtained from an actuation amount relational expression.

Storage unit 12 stores the actuation amount relational expressions. One expression (hereinafter referred to as the engagement actuation amount relational expression) is established to actuate clutch actuator 14 in the direction to engage clutch 40, if the torque deviation (Ttg−Tac) is positive as shown in FIG. 6. Another expression (hereinafter referred to as the disengagement actuation amount relational expression) is established to actuate clutch actuator 14 in the opposite direction or the direction to disengage clutch 40. FIG. 7 is a graph showing the relationship between the torque deviation (Ttg−Tac) and the command actuation amount obtained from the disengagement actuation amount relational expression. In the graph shown in FIG. 7, the actuation amount relational expression is established such that if the torque deviation (Ttg−Tac) is positive, clutch actuator 14 is actuated in the direction to disengage clutch 40, in contrast to the graph shown in FIG. 6.

Clutch actuator control section 11j selects either the engagement or disengagement actuation amount relational expression, depending on a positive or negative value of the clutch rotational speed difference. If the clutch rotational speed difference is positive, clutch actuator control section 11j selects the engagement actuation amount relational expression to substitute the torque deviation (Ttg−Tac) into the engagement actuation amount relational expression. In contrast, if the clutch rotational speed difference is negative, clutch actuator control section 11j selects the disengagement actuation amount relational expression to substitute the torque deviation (Ttg−Tac) into the disengagement actuation amount relational expression.

Alternatively, in place of the engagement and disengagement actuation amount relational expressions, storage unit 12 may store a table that establishes the correspondence between the command actuation amount, and target transmission torque Ttg and actual transmission torque Tac. In this case, clutch actuator control section 11j refers to the table, without calculating the torque deviation (Ttg−Tac), to directly obtain the command actuation amount that corresponds to target transmission torque Ttg and actual transmission torque Tac.

Clutch actuator control section 11j actuates clutch actuator 14 by an amount according to the torque deviation (Ttg−Tac)

for engaging operation of clutch 40. Consequently, when the clutch rotational speed difference is below the aforementioned rotational speed difference for discontinuing half-clutch, clutch actuator control section 11j discontinues the half-clutch state to completely engage drive-side member 41 with driven-side member 42.

The processing executed by shift actuator control section 11k is now described. When the rider operates shift-up switch 9a or shift-down switch 9b to input a gear shift command, shift actuator control section 11k actuates shift actuator 16 to change shift gears 53a, 53b, 54a, 54b. Specifically, after detecting that clutch 40 is disengaged based on the signal inputted from clutch position detector 22, shift actuator control section 11k outputs the control signal to shift actuator drive circuit 15. Shift actuator 16 is actuated by driving power supplied from shift actuator drive circuit 15 to move some of shift gears 53a, 53b, 54a, 54b.

Figure 8:
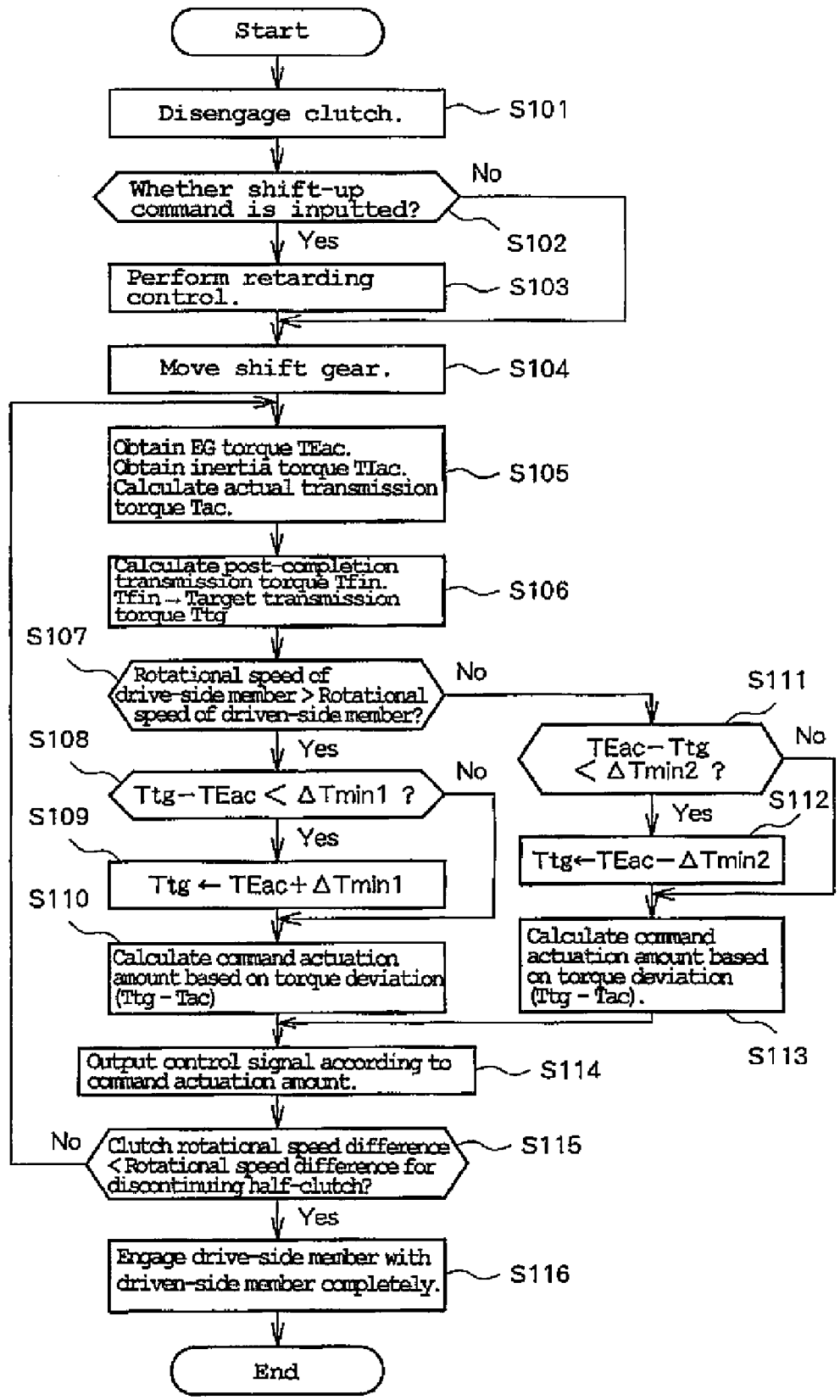
FIG. 8 is a flowchart showing processing steps executed by the control unit.
Figure 9:
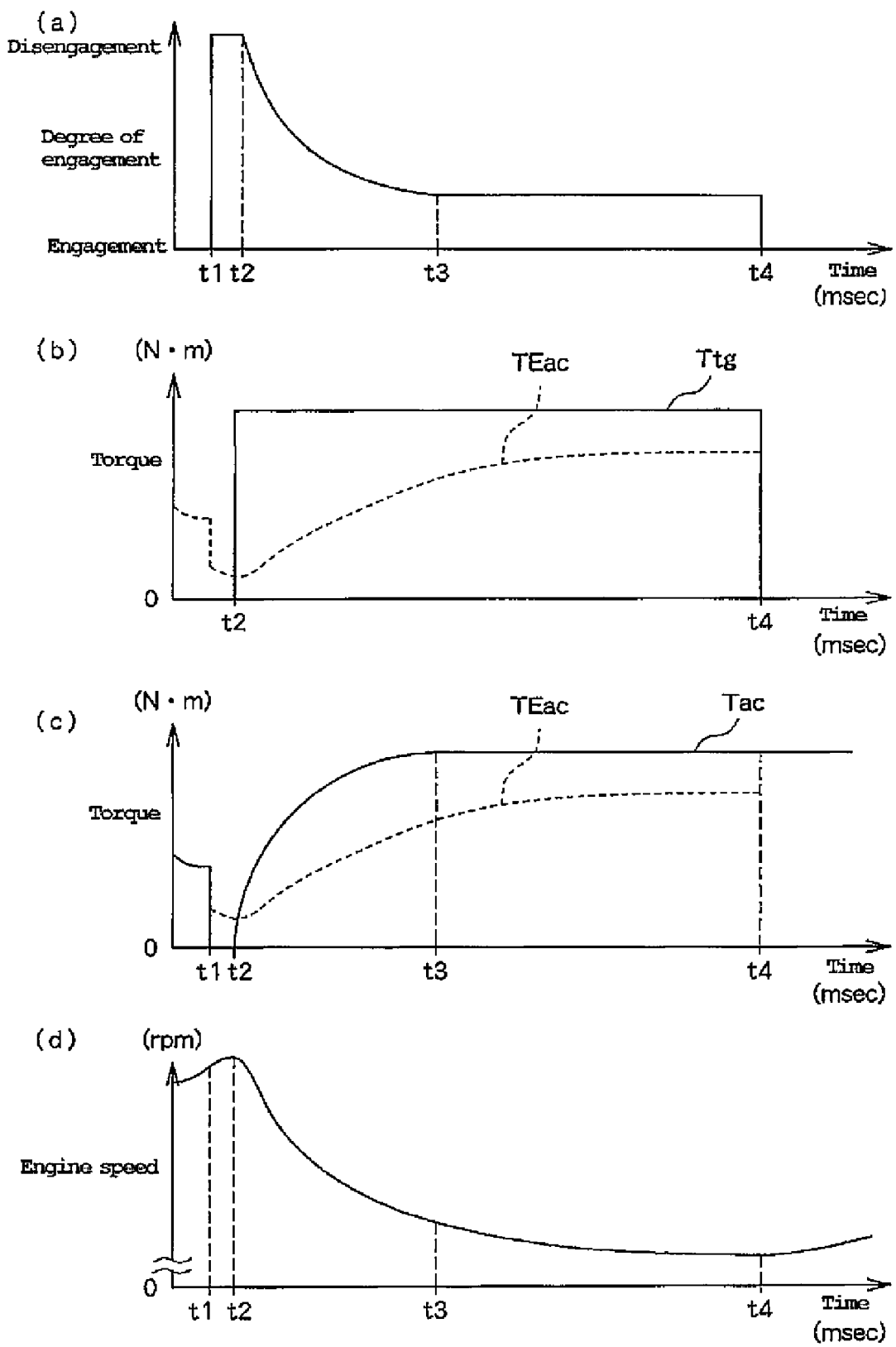
FIGS. 9(a)-9(d) are time charts for describing changes in degree of engagement of the clutch, target transmission torque, actual transmission torque, EG torque and engine speed.
Figure 10:
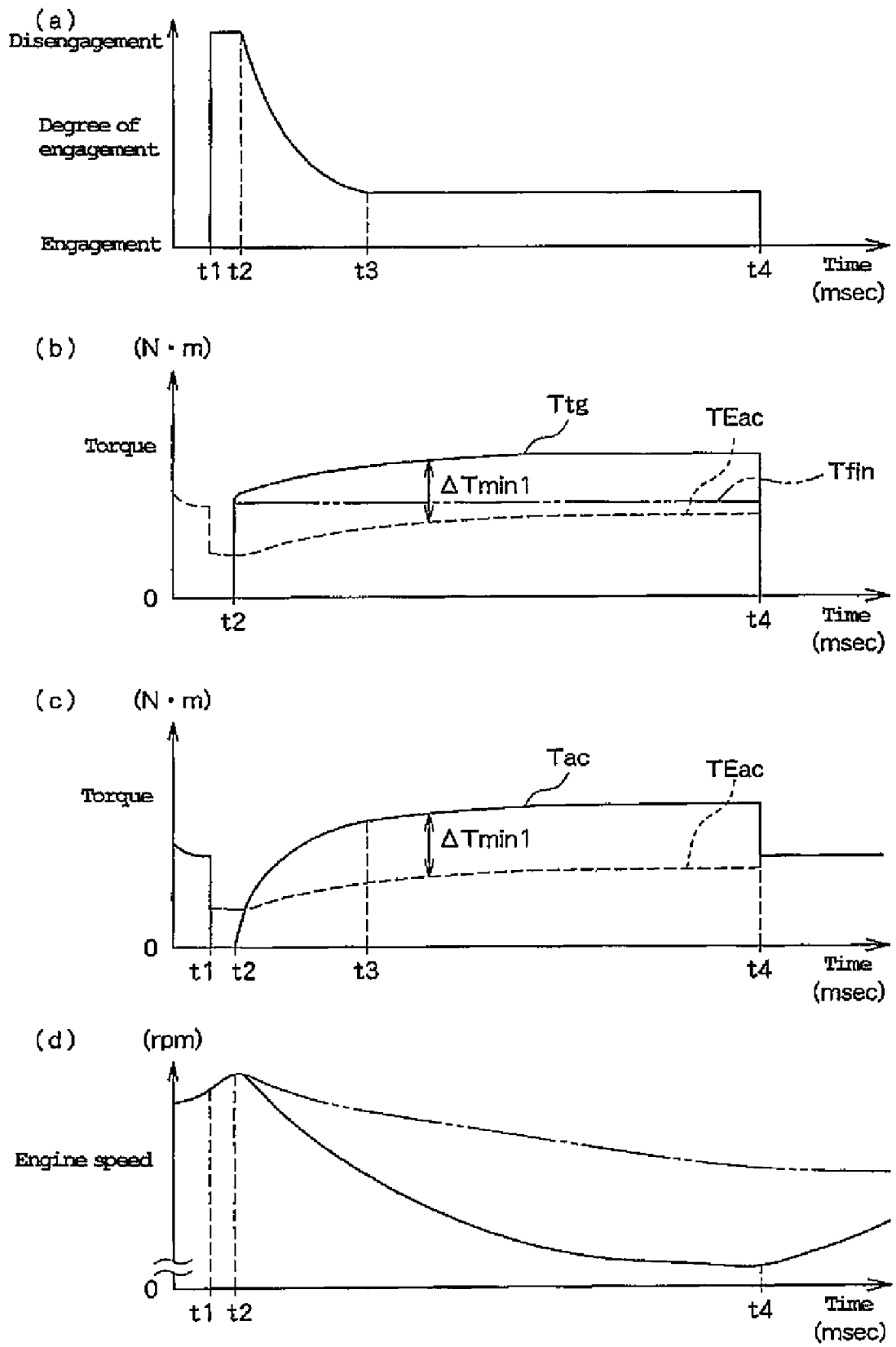
FIGS. 10(a)-10(d) are time charts for describing changes in degree of engagement of the clutch, target transmission torque, actual transmission torque, EG torque and engine speed.
Figure 11:
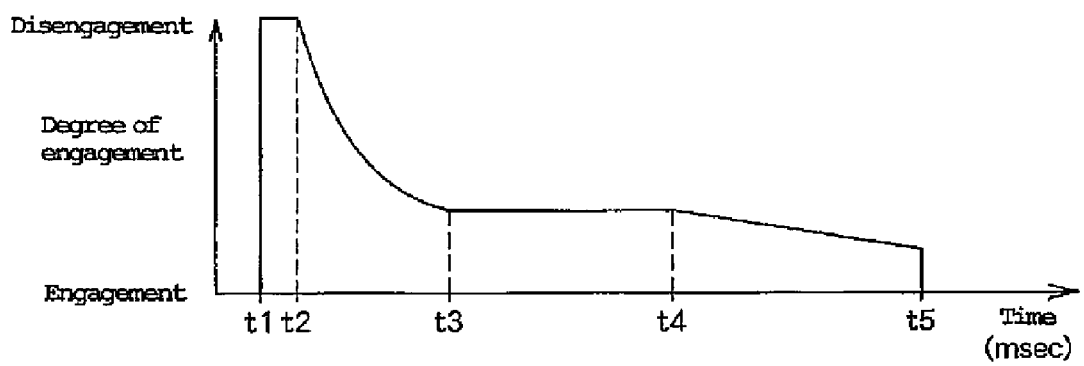
FIGS. 11(a)-11(d) are time charts for describing changes in degree of engagement of the clutch, target transmission torque, actual transmission torque, EG torque and engine speed.
Figure 11:
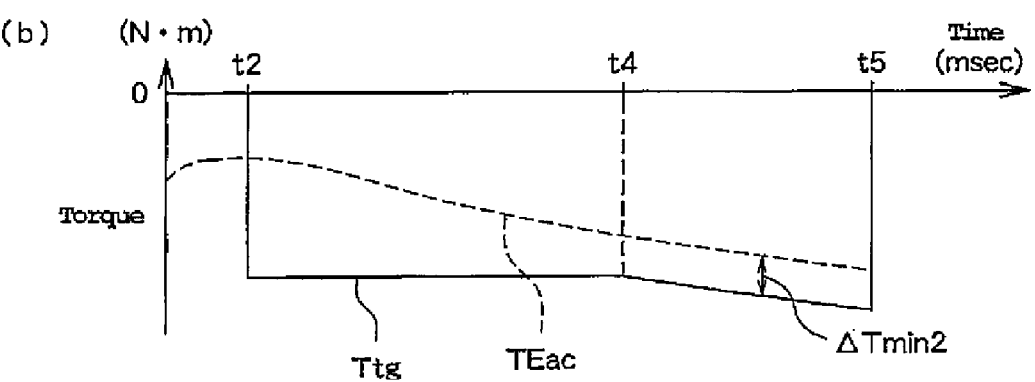
Figure 11:
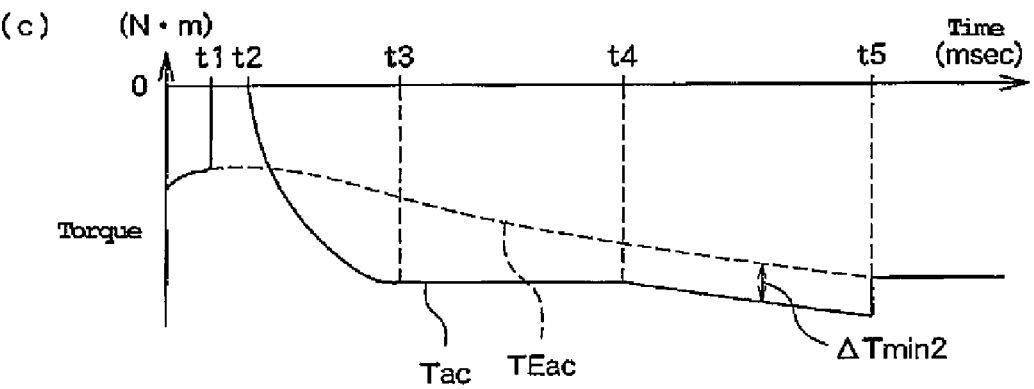
Figure 11:
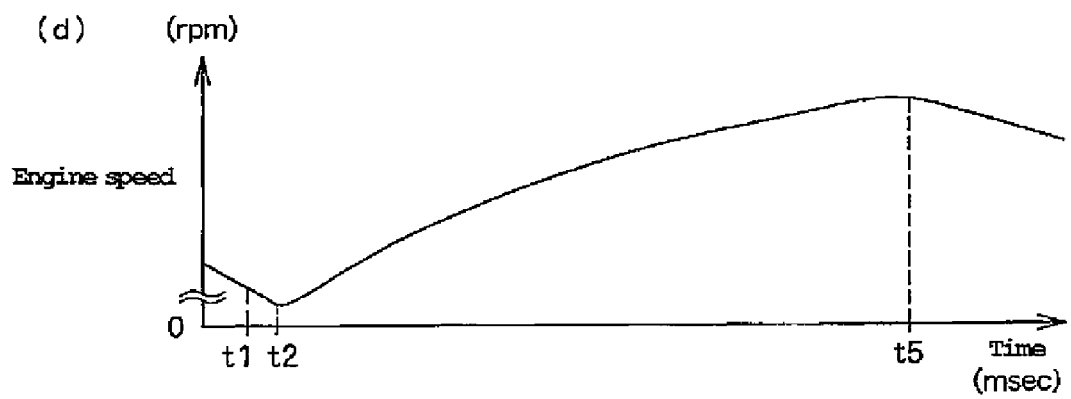
Figure 12:
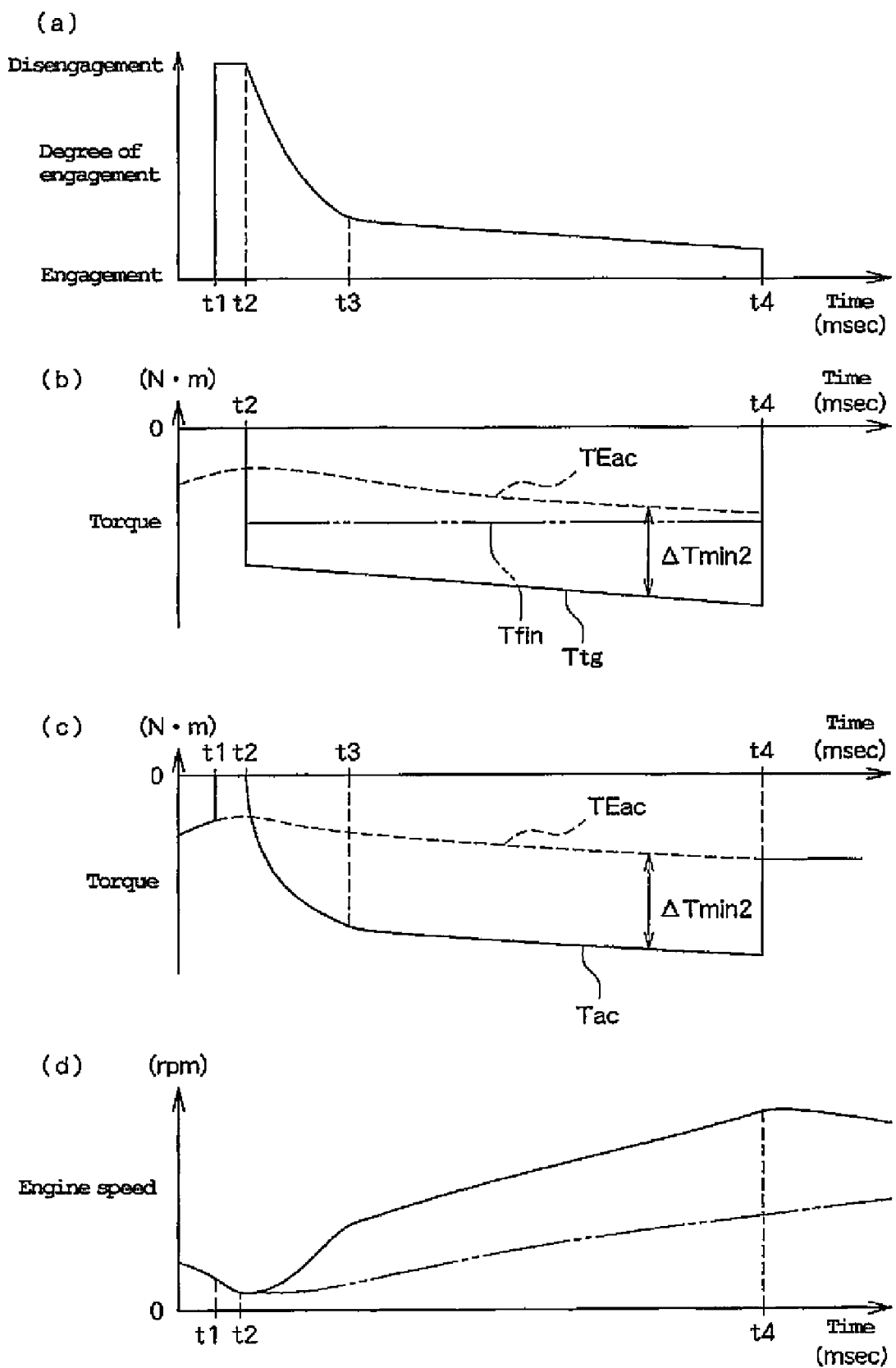
FIGS. 12(a)-12(d) are time charts for describing changes in degree of engagement of the clutch, target transmission torque, actual transmission torque, EG torque and engine speed.

The flow of processing executed by control unit 11 is now described. FIG. 8 is a flowchart showing an example of processing executed by control unit 11 at the time of gear shifting.

When the rider turns shift-up switch 9a or shift-down switch 9b ON, clutch actuator control section 11j disengages clutch 40 (step S101). Gear shifting engine control section 11L determines whether or not the shift-up command is inputted (step S102). If the shift-up command is inputted, gear shifting engine control section 11L retards the ignition timing in engine 30, thereby reducing the torque outputted from engine 30 (step S103). In contrast, if the shift-down command is inputted, subsequent processing steps are executed while maintaining the ignition timing in engine 30 at the ignition timing for normal driving. After clutch 40 is disengaged, shift actuator control section 11k actuates shift actuator 16 according to the gear shift command from the rider to move some of shift gears 53a, 53b, 54a, 54b (step S104).

Control unit 11 starts engaging operation of clutch 40 after detecting that some shift gears 53a, 53b, 54a, 54b have been moved already based on the signal inputted from gear position detector 21. Specifically, EG torque obtaining section 11b calculates EG torque TEac, while actual torque obtaining section 11a calculates actual transmission torque Tac based on the calculated EG torque TEac and the inertia torque TIac calculated by inertia torque obtaining section 11c (step S105). In turn, post-completion torque obtaining section 11e calculates torque Tfin (hereinbefore referred to as post-completion transmission torque) that is estimated to be transmitted from drive-side member 41 to driven-side member 42 after completion of engagement of clutch 40, and defines the calculated torque Tfin as tentative target transmission torque Ttg (step S106).

After that, appropriateness determining section 11i starts the processing for determining whether or not the clutch rotational speed difference is reduced at an appropriate rate during engaging operation of clutch 40. First, appropriateness determining section 11i compares the rotational speeds of drive-side member 41 and driven-side member 42 (step S107). If the rotational speed of drive-side member 41 is relatively higher, appropriateness determining section 11i determines whether or not the difference between target transmission torque Ttg, calculated in step S106, and EG torque TEac, calculated in step S105, (Ttg−TEac) is smaller than a correction condition torque difference ΔTmin1 (step S108). If the difference (Ttg−TEac) is smaller than correction condition torque difference ΔTmin1, correction processing section 11h adds correction condition torque difference ΔTmin1 to EG torque TEac, and sets target transmission torque Ttg at the obtained value (TEac+ΔTmin1), rather than at post-completion transmission torque Tfin (step S109). Clutch actuator control section 11j then substitutes the difference between corrected target transmission torque Ttg and actual transmission torque Tac (Ttg−Tac) into the engagement actuation amount relational expression, in order to calculate the amount by which clutch actuator 14 is to be actuated, or the command actuation amount (step S110). In contrast, in step S108, if the difference (Ttg−TEac) is not smaller than correction condition torque difference ΔTmin1, no correction processing is performed by correction processing section 11h, and clutch actuator control section 11j substitutes the difference between actual transmission torque Tac and target transmission torque Ttg, which is set at post-completion transmission torque Tfin in step S106, into the engagement actuation amount relational expression in order to calculate the command actuation amount (step S110).

In turn, if the comparison result from step S107 shows that the rotational speed of drive-side member 41 is lower than the rotational speed of driven-side member 42, appropriateness determining section 11i determines whether or not the difference between target transmission torque Ttg, calculated in step S106, and EG torque TEac, calculated in step S105, (TEac−Ttg) is smaller than a correction condition torque difference ΔTmin2 (step S111). If the difference (TEac−Ttg) is smaller than correction condition torque difference ΔTmin2, correction processing section 11h subtracts correction condition torque difference ΔTmin2 from EG torque TEac, and sets target transmission torque Ttg at the obtained value (TEac−ΔTmin2), rather than at post-completion transmission torque Tfin (step S112). Clutch actuator control section 11j then substitutes the difference between corrected target transmission torque Ttg and actual transmission torque Tac (Ttg−Tac) into the disengagement actuation amount relational expression, and calculates the command actuation amount (step S113). In contrast, in step S111, if the difference (Ttg−TEac) is not smaller than correction condition torque difference ΔTmin2, no correction processing is performed by correction processing section 11h, and clutch actuator control section 11j substitutes the difference between actual transmission torque Tac and target transmission torque Ttg, which is set at post-completion transmission torque Tfin in step S106, into the disengagement actuation amount relational expression in order to calculate the command actuation amount (step S113). When the command actuation amount is calculated in step S110 or S113, clutch actuator control section 11j outputs a control signal to clutch actuator drive circuit 13 according to the command actuation amount (step S114). Thereby, clutch actuator 14 is actuated by the command actuation amount, so that the degree of engagement of clutch 40 changes.

Next, clutch actuator control section 11j calculates the clutch rotational speed difference, and determines whether or not the calculated clutch rotational speed difference is smaller than the rotational speed difference for discontinuing half-clutch (step S115). If the calculated clutch rotational speed difference is smaller than the rotational speed difference for discontinuing half-clutch, clutch actuator control section 11j completely engages drive-side member 41 with driven-side member 42 to discontinue the half-clutch state (step S116). Control unit 11 thereby ends the processing for gear shifting. Simultaneously, gear shifting engine control section 11L ends retarding control. In contrast, if the calculated clutch rotational speed difference is not yet smaller than the rotational speed difference for discontinuing half-clutch, control unit 11 returns to step S105 to repeat the subsequent steps in a predetermined cycle (for example, several milliseconds) until the half-clutch state is discontinued in step S116.

The processing executed by control unit 11 is not limited to the above-mentioned processing. For example, correction condition torque difference ΔTmin1, ΔTmin2 may not be a fixed value, but may depend on the clutch rotational speed difference. For example, storage unit 12 may store a table that establishes the correspondence between correction condition torque difference ΔTmin1, ΔTmin2 and the clutch rotational speed difference. In this table, for example, correction condition torque difference ΔTmin1, ΔTmin2 is preset greater as the clutch rotational speed difference is greater. In this case, control unit 11 calculates the clutch rotational speed difference and corrects target transmission torque Ttg based on correction condition torque difference ΔTmin1, ΔTmin2 that corresponds to the calculated clutch rotational speed difference.

Before step S108 or S111, control unit 11 calculates the clutch rotational speed difference and obtains correction condition torque difference ΔTmin1, ΔTmin2 that corresponds to the calculated clutch rotational speed difference. Then, in step S108 or S111, control unit 11 compares correction condition torque difference ΔTmin1, ΔTmin2, obtained from the table, with the difference between target transmission torque Ttg and EG torque TEac. If the difference between target transmission torque Ttg and EG torque TEac is smaller than correction condition torque difference ΔTmin1, ΔTmin2, control unit 11 adds correction condition torque difference ΔTmin1 to EG torque TEac in step S109 or subtracts correction condition torque difference ΔTmin2 from EG torque TEac in step S111. Thereby, when the clutch rotational speed difference is relatively large at the early stage of engaging operation of clutch 40, control unit 11 corrects target transmission torque Ttg by a relatively large amount. This results in a higher rate-of-change of engine speed. In contrast, when the clutch rotational speed difference is reduced during engaging operation of clutch 40, the difference between corrected target transmission torque Ttg and post-completion transmission torque Tfin is also reduced. Accordingly, the difference between actual transmission torque Tac and post-completion transmission torque Tfin is reduced. Consequently, variations in actual transmission torque Tac are minimized at the time of completely engaging drive-side member 41 with driven-side member 42, which reduces shocks produced on the vehicle.

Changes in the degree of engagement of clutch 40, target transmission torque Ttg, actual transmission torque Tac and engine speed with respect to time, when the control discussed above is performed, are now described. FIGS. 9(a)-9(d) through FIGS. 12(a)-12(d) are time charts respectively showing examples of changes in degree of engagement of clutch 40, target transmission torque Ttg, actual transmission torque Tac, EG torque TEac and engine speed at the time of gear shifting. FIGS. 9(a)-12(a) show the degree of engagement of clutch 40. FIGS. 9(b)-12(b) show target transmission torque Ttg and EG torque TEac. FIGS. 9(c)-12(c) show actual transmission torque Tac and EG torque TEac. FIGS. 9(d)-12(d) show engine speed.

The shift-up operation is first described with reference to FIGS. 9(a)-9(d). In this example, the rotational speed of drive-side member 41 is higher than the rotational speed of driven-side member 42, and post-completion transmission torque Tfin, which is calculated by post-completion torque obtaining section 11e, is high enough (target transmission torque Ttg, which is set at post-completion transmission torque Tfin, is higher than EG torque TEac by an amount equal to or greater than correction condition torque difference ΔTmin1).

At time t1, when the rider presses shift-up switch 9a down, clutch 40 is switched from the engaged state to the disengaged state, as shown in FIG. 9(a). Consequently, as shown in FIG. 9(c), actual transmission torque Tac is zero. Simultaneously, because gear shifting engine control section 11L starts retarding control, EG torque TEac is lower than past values of actual transmission torque Tac. As described above, after clutch 40 is switched to the disengaged state, shift actuator control section 11k moves some of shift gears 53a, 53b, 54a, 54b.

At time t2, when some of shift gears 53a, 53b, 54a, 54b have already been moved, post-completion torque obtaining section 11f calculates post-completion torque Tfin. Post-completion torque Tfin is considered as torque estimated to be transmitted via clutch 40 after completion of engagement of clutch 40. In this example, post-completion torque Tfin is the actual transmission torque Tac at time t4. As described above, post-completion transmission torque Tfin is higher than EG torque TEac by an amount equal to or greater than correction condition torque difference ΔTmin1. Thus, at time t2, target transmission torque Ttg is set at post-completion transmission torque Tfin, and no correction processing for target transmission torque Ttg is therefore performed.

After target transmission torque Ttg is set at time t2, engaging operation of clutch 40 starts. Specifically, under control by clutch actuator control section 11j, clutch actuator 14 is actuated by an amount according to the difference between target transmission torque Ttg and actual transmission torque Tac. Thus, as shown in FIGS. 9(a) and 9(c), as clutch 40 is gradually closer to the engaged state, the actual transmission torque Tac gradually approximates target transmission torque Ttg. Then, at time t3, actual transmission torque Tac reaches target transmission torque Ttg. After that, the difference between actual transmission torque Tac and target transmission torque Ttg is almost eliminated, and therefore, the degree of engagement of clutch 40 is almost maintained, as shown in FIG. 9(a).

As shown in FIG. 9(c), actual transmission torque Tac exceeds EG torque TEac in the process of its increase to target transmission torque Ttg. Thus, as shown in FIG. 9(d), engine speed starts decreasing gradually from the point in time when actual transmission torque Tac exceeds EG torque TEac. The clutch rotational speed difference is thereby gradually closer to zero. Generally, the output characteristics of engine 30 show that EG torque TEac increases as engine speed decreases. Thus, as shown in FIG. 9(c), EG torque TEac gradually increases. Consequently, the difference between EG torque TEac and actual transmission torque Tac is gradually reduced, and therefore, engine speed decreases at a gradually lower rate, as shown in FIG. 9(d).

At time t4, when the clutch rotational speed difference is smaller than the rotational speed difference for discontinuing half-clutch, clutch 40 is completely engaged, as shown in FIG. 9(a). In addition, gear shifting engine control section 11L ends retarding control, and accordingly, EG torque TEac increases, as shown in FIG. 9(c). As described above, in the processing for calculating post-completion transmission torque Tfin, post-completion EG torque TEfin, which is calculated by post-completion EG torque obtaining section 11e, is considered as torque estimated to be outputted from engine 30 after completion of clutch engagement under no retarding control. In addition, the rotational speed difference for discontinuing half-clutch is preset at zero or close to zero. At time t4, drive-side member 41 is completely engaged with driven-side member 42, resulting in zero inertia torque TIac. This allows actual transmission torque Tac to be kept almost constant at around time t4 when retarding control ends.

Now, with reference to FIGS. 10(a)-10(d), a case is described where the rotational speed of drive-side member 41 is higher than the rotational speed of driven-side member 42, and post-completion transmission torque Tfin is relatively low (where the difference between EG torque TEac and target transmission torque Ttg set at post-completion transmission torque Tfin is smaller than correction condition torque difference ΔTmin1).

As in the case shown in FIGS. 9(a)-9(d), at time t1, when the rider presses shift-up switch 9a down, clutch 40 is switched from the engaged state to the disengaged state (see FIG. 10(a)). Consequently, actual transmission torque Tac is zero (see FIG. 10(c)). Simultaneously, because gear shifting engine control section 11L starts retarding control, EG torque TEac is lower than past values of actual transmission torque Tac. Next, at time t2, when some of shift gears 53a, 53b, 54a, 54b have already been moved, target transmission torque 11e performs processing to set target transmission torque Ttg. As described above, the difference between EG torque TEac and target transmission torque Ttg that is set at post-completion transmission torque Tfin (torque shown by the phantom line in FIG. 10(b)) is smaller than correction condition torque difference ΔTmin1. Thus, correction processing section 11h performs processing to set target transmission torque Ttg at a value obtained by adding correction condition torque difference ΔTmin1 to EG torque TEac (TEac+ΔTmin1).

After target transmission torque Ttg is set at time t2, engaging operation of clutch 40 starts. Specifically, as shown in FIGS. 10(a) and 10(b), as clutch 40 is gradually closer to the engaged state, actual transmission torque Tac gradually approximates target transmission torque Ttg. Then, at time t3, actual transmission torque Tac reaches target transmission torque Ttg.

In this case, as in the case shown in FIGS. 9(a)-9(d), actual transmission torque Tac exceeds EG torque TEac in the process of its increase to target transmission torque Ttg (see FIG. 10(c)). Thus, as shown in FIG. 10(d), engine speed starts decreasing gradually from the point in time when actual transmission torque Tac exceeds EG torque TEac. Thereby, the clutch rotational speed difference is gradually closer to zero.

After that, at time t4, when the clutch rotational speed difference is smaller than the rotational speed difference for discontinuing half-clutch, clutch 40 is completely engaged, as shown in FIG. 10(a), so that the half-clutch state is discontinued. Simultaneously, gear shifting engine control section 11L ends retarding control, and accordingly, EG torque TEac increases, as shown in FIG. 10(c). As described above, the rotational speed difference for discontinuing half-clutch is preset at or close to zero. At time t4, drive-side member 41 is completely engaged with driven-side member 42, resulting in zero inertia torque TIac. In addition, as described above, for calculating post-completion transmission torque Tfin, post-completion EG torque TEfin, which is calculated by post-completion EG torque obtaining section 11e, is considered as torque estimated to be outputted from engine 30 after completion of clutch engagement under no retarding control. Thus, at time t4, actual transmission torque Tac decreases slightly, thereby corresponding with post-completion transmission torque Tfin.

The phantom line in FIG. 10(d) shows an example of changes in engine speed with respect to time when no correction processing is performed by correction processing section 11h. As described above, correction processing section 11h performs processing to set target transmission torque Ttg at a value obtained by adding correction condition torque difference ΔTmin1 to EG torque TEac. Thus, as shown in FIG. 10(d), the rate at which engine speed decreases is kept higher compared to the case with no correction processing, and the clutch rotational speed difference is thus eliminated earlier.

The shift-down operation is now described with reference to FIGS. 11(a)-11(d). In this example, the rotational speed of driven-side member 42 is higher than the rotational speed of drive-side member 41, and the calculated post-completion transmission torque Tfin is a sufficiently low negative value (the difference between post-completion transmission torque Tfin and EG torque TEac is equal to or greater than correction condition torque difference ΔTmin2).

At time t1, when the rider turns shift-down switch 9b ON, clutch 40 is switched from the engaged state to the disengaged state, as in the case shown in FIGS. 9(a)-9(d) (see FIG. 11(a)). Consequently, actual transmission torque Tac is zero (see FIG. 11(c)). Then, at time t2, when some of shift gears 53a, 53b, 54a, 54b have been already moved, target transmission torque Ttg is set. As described above, the difference between EG torque TEac and post-completion transmission torque Tfin, which is calculated by post-completion torque obtaining section 11e, is greater than correction condition torque difference ΔTmin2. Thus, target transmission torque Ttg is set at post-completion transmission torque Tfin, and no correction processing for target transmission torque Ttg is therefore performed.

As in the case shown in FIGS. 9(a)-9(d), after target transmission torque Ttg is set at time t2, clutch actuator 14 is actuated by an amount according to the difference between target transmission torque Ttg and actual transmission torque Tac. Thus, as shown in FIGS. 11(a) and 11(b), as clutch 40 is gradually closer to the engaged state, actual transmission torque Tac gradually approximates target transmission torque Ttg. Then, at time t3, actual transmission torque Tac reaches target transmission torque Ttg.

As shown in FIG. 11(c), actual transmission torque Tac is below EG torque TEac in the process of its decrease to target transmission torque Ttg. Thus, as shown in FIG. 11(d), engine speed starts increasing gradually from the point in time when actual transmission torque Tac exceeds below EG torque TEac. Thereby, the clutch rotational speed difference is gradually closer to zero. As described above, generally, the output characteristics of engine 30 show that EG torque TEac decreases as engine speed increases. Thus, as shown in FIG. 11(c), EG torque TEac decreases as engine speed increases, and the difference between EG torque TEac and actual transmission torque Tac is gradually reduced.

At time t4, when the difference between EG torque TEac and target transmission torque Ttg is smaller than correction condition torque difference ΔTmin2, target transmission torque Ttg, which has been set at post-completion transmission torque Tfin, is corrected to a value obtained by subtracting correction condition torque difference ΔTmin2 from EG torque TEac (TEac−ΔTmin2). Consequently, from time t4 onwards, clutch 40 is gradually closer to the engaged state such that actual transmission torque Tac follows corrected target transmission torque Ttg.

After that, at time t5, when the clutch rotational speed difference is smaller than the rotational speed difference for discontinuing half-clutch, clutch 40 is completely engaged, so that the half-clutch state is discontinued (see FIG. 11(a)). Thereby, the engine speed stops increasing, resulting in zero inertia torque TIac. Therefore, actual transmission torque Tac increases by correction condition torque difference ΔTmin2 and thus corresponds with EG torque TEac. As described above, correction condition torque difference ΔTmin2 is determined depending on the clutch rotational speed difference. This allows actual transmission torque Tac to increase by a relatively small amount at time t5.

Now, with reference to FIGS. 12(a)-12(d), a case is described where the rotational speed of driven-side member 42 is higher than the rotational speed of drive-side member 41, and the difference between post-completion transmission torque Tfin and EG torque TEac is smaller than correction condition torque difference ΔTmin2.

As in the case shown in FIGS. 11(a)-11(d), at time t1, when the rider presses shift-down switch 9b down, clutch 40 is switched from the engaged state to the disengaged state (see FIG. 12(a)). Consequently, actual transmission torque Tac is zero (see FIG. 12(c)). After that, at time t2, when some of shift gears 53a, 53b, 54a, 54b have already been moved, target transmission torque 11e performs processing to set target transmission torque Ttg. As described above, the difference between EG torque TEac and post-completion transmission torque Tfin, which is calculated by post-completion torque obtaining section 11e, is smaller than correction condition torque difference ΔTmin2. Thus, target transmission torque Ttg, which has been set at post-completion transmission torque Tfin by post-completion torque obtaining section 11e, is corrected to a value obtained by subtracting correction condition torque difference ΔTmin2 from EG torque TEac (TEac−ΔTmin2).

After target transmission torque Ttg is set at time t2, engaging operation of clutch 40 starts. Specifically, as shown in FIGS. 12(a) and 12(b), as a result that clutch 40 is closer to the engaged state, actual transmission torque Tac approximates target transmission torque Ttg. Then, at time t3, actual transmission torque Tac reaches target transmission torque Ttg.

Also in this case, engine speed starts increasing gradually from the point in time when actual transmission torque Tac is below EG torque TEac. The difference in rotational speed between drive-side member 41 and driven-side member 42 is thereby gradually reduced. Generally, the engine output characteristics show that EG torque TEac decreases gradually as engine speed increases. Thus, as shown in FIG. 12(b), target transmission torque Ttg decreases gradually from time t2 onwards, and as shown in FIG. 12(c), actual transmission torque Tac follows target transmission torque Trg.

After that, at time t4, when the clutch rotational speed difference is smaller than the rotational speed difference for discontinuing half-clutch, clutch 40 is completely engaged, as shown in FIG. 12(a). In addition, as shown in FIGS. 12(c) and 12(d), engine speed stops increasing, resulting in zero inertia torque TIac, and therefore, actual transmission torque Tac increases by correction condition torque difference ΔTmin2 and thus corresponds with EG torque TEac. As described above, correction condition torque difference ΔTmin2 is determined depending on the clutch rotational speed difference. This allows actual transmission torque Tac to increase by a smaller amount at time t4.

The phantom line in FIG. 12(d) shows an example of changes in engine speed with respect to time when no correction processing is performed by correction processing section 11h. As described above, correction processing section 11h performs processing to set target transmission torque Ttg at a value obtained by subtracting correction condition torque difference ΔTmin2 from EG torque TEac. Thus, as shown in FIG. 12(d), the rate at which engine speed increases is kept higher compared to the case with no correction processing, and the clutch rotational speed difference is thus eliminated earlier.

In clutch controller 10, the degree of engagement of clutch 40 is controlled based on the difference between actual transmission torque Tac, which is transmitted from drive-side member 41 of clutch 40 to driven-side member 42 or the mechanism downstream of driven-side member 42, and target transmission torque Ttg, which is supposed to be transmitted. This allows an appropriate amount of torque to be transmitted via clutch 40. In addition, it is determined whether or not the difference in rotational speed between drive-side member 41 and driven-side member 42 is reduced at an appropriate rate. According to the determination result, target transmission torque Ttg is corrected. This avoids the situation where the clutch rotational speed difference is reduced at an excessively low rate, and therefore, prevents clutch 40 from spending too much time on the engaging operation.

Further, in clutch controller 10, actual torque obtaining section ha calculates actual transmission torque Tad based on EG torque TEac and inertia torque TIac produced due to the inertia of the mechanism upstream of drive-side member 41 in the torque transmission path (such as crankshaft 34, piston 32 and primary speed reducing mechanism 36). Actual transmission torque Tac is thus obtained without providing any specific sensor for outputting a signal according to actual transmission torque Tac.

Still further, in clutch controller 10, post-completion torque obtaining section 11e, included in target torque obtaining section 11d, sets target transmission torque Ttg at torque estimated to be transmitted from drive-side member 41 to driven-side member 42 or the mechanism downstream of driven-side member 42 after completion of engagement of clutch 40 (hereinbefore referred to as the post-completion transmission torque Tfin). Correction processing section 11h corrects target transmission torque Ttg based on the determination result from appropriateness determining section 11i. This minimizes changes in actual transmission torque Tac at the time of completely engaging clutch 40, further improving riding comfort of the vehicle. In addition, post-completion torque obtaining section 11e sets target transmission torque Ttg at a value small enough to prevent the clutch rotational speed difference from being reduced at an excessively low rate.

Clutch controller 10 has EG torque obtaining section 11b for obtaining the torque outputted from engine 30 as engine torque. Target torque obtaining section 11d corrects target transmission torque Ttg to increase the difference between the corrected target transmission torque Ttg and EG torque TEac. This prevents the clutch rotational speed difference from being reduced at a low rate, which can be caused due to the reduced difference between target transmission torque Ttg and EG torque TEac.

Further, according to one aspect of clutch controller 10, appropriateness determining section 11i determines whether or not the clutch rotational speed difference is reduced at an appropriate rate based on the difference between target transmission torque Ttg and EG torque TEac. This allows target transmission torque Ttg to be corrected before the clutch rotational speed difference is actually reduced at an excessively low rate, thereby more effectively preventing clutch 40 from spending too much time on its engaging operation.

According to this aspect, appropriateness determining section 11i compares the difference between target transmission torque Ttg and EG torque TEac (hereinbefore referred to as correction condition torque difference ΔTmin1, ΔTmin2) with a predetermined value. Then, according to the comparison result, appropriateness determining section 11i determines whether or not the clutch rotational speed difference is reduced at an appropriate rate. This avoids the situation where the clutch rotational speed difference is reduced at an excessively low rate, by means of simpler processing than the processing for calculating the rate at which the difference between EG torque TEac and target transmission torque Ttg is reduced.

Still further, in clutch controller 10, gear shifting engine control section 11L controls engine 30 such that EG torque TEac decreases during engaging operation of clutch 40. This also increases the difference between EG torque TEac and actual transmission torque Tac, thereby avoiding the situation where the clutch rotational speed difference is reduced at an excessively low rate.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A clutch controller comprising:
    an actuator for changing a degree of engagement between a drive-side member and a driven-side member of a clutch;
    an actual torque obtaining section for obtaining torque transmitted from the drive-side member to a downstream mechanism of a torque transmission path as actual transmission torque, the downstream mechanism including the driven-side member;
    a target torque obtaining section for obtaining torque that is supposed to be transmitted from the drive-side member to the downstream mechanism as target transmission torque; and
    a control unit for controlling the degree of engagement of the clutch by actuating the actuator based on a difference between the actual transmission torque and the target transmission torque,
    wherein the target torque obtaining section includes a determining section for determining whether or not a difference in rotational speed between the drive-side member and the driven-side member is reduced at an appropriate rate, and depending on the determination result, corrects the target transmission torque.

2. The clutch controller according to claim 1, wherein the actual torque obtaining section calculates the actual transmission torque based on engine torque and torque produced due to inertia of a mechanism upstream of the drive-side member in the torque transmission path.

3. The clutch controller according to claim 1, wherein the target torque obtaining section sets the target transmission torque at torque estimated to be transmitted from the drive-side member to the downstream mechanism after completion of engagement of the clutch, and depending on the determination result from the determining section, corrects the set target transmission torque.

4. The clutch controller according to claim 1, further comprising an engine torque obtaining section for obtaining torque outputted from an engine as engine torque, wherein the target torque obtaining section corrects the target transmission torque to increase a difference between the corrected target transmission torque and the engine torque.

5. The clutch controller according to claim 4, wherein the determining section determines whether or not the difference in rotational speed between the drive-side member and the driven-side member is reduced at an appropriate rate based on the difference between the target transmission torque and the engine torque.

6. The clutch controller according to claim 4, wherein the determining section compares the difference between the target transmission torque and the engine torque with a predetermined value, and based on the comparison result, determines whether or not the difference in rotational speed between the drive-side member and the driven-side member is reduced at an appropriate rate.

7. The clutch controller according to claim 1, further comprising an engine control section for controlling an engine in order to decrease engine torque during engaging operation of the clutch.

8. A straddle-type vehicle comprising the clutch controller according to claim 1.

9. A method for controlling a clutch comprising the steps of:
    obtaining torque transmitted from a drive-side member of the clutch to a downstream mechanism in a torque transmission path as actual transmission torque, the downstream mechanism including a driven-side member of the clutch;
    obtaining torque that is supposed to be transmitted from the drive-side member to the downstream mechanism as target transmission torque;
    controlling a degree of engagement of the clutch by actuating an actuator based on a difference between the actual transmission torque and the target transmission torque;
    determining whether or not a difference in rotational speed between the drive-side member and the driven-side member is reduced at an appropriate rate; and
    correcting the target transmission torque depending on the determination result from the determining step.

* * * * *